United States Patent [19]

Ferketic

[11] Patent Number: 5,021,968
[45] Date of Patent: Jun. 4, 1991

[54] GRAPHICS-BASED WIRE-CABLE MANAGEMENT SYSTEM

[75] Inventor: John A. Ferketic, Pittsburgh, Pa.

[73] Assignee: Robertson-Ceco Corporation, Pittsburgh, Pa.

[21] Appl. No.: 440,464

[22] Filed: Nov. 20, 1989

Related U.S. Application Data

[63] Continuation of Ser. No. 3,004, Jan. 13, 1987, abandoned.

[51] Int. Cl.$^5$ .............................................. G06F 15/20
[52] U.S. Cl. ..................................... 364/505; 364/512; 364/491; 364/518; 379/272; 379/221; 340/827
[58] Field of Search ............... 364/505, 512, 513, 518, 364/521, 522, 488–493, 495, 555; 52/221; 174/49; 340/723, 729, 825.05, 825.06, 826, 827; 379/219–221, 272, 273, 243, 245, 247, 29

[56] References Cited

U.S. PATENT DOCUMENTS

| | | | |
|---|---|---|---|
| 4,275,449 | 6/1981 | Aish | 364/512 |
| 4,590,336 | 5/1986 | Ray et al. | 379/273 |
| 4,615,011 | 9/1986 | Linsker | 364/491 |
| 4,636,965 | 1/1987 | Smith et al. | 364/491 |
| 4,700,317 | 10/1987 | Watanabe et al. | 364/512 |
| 4,752,887 | 6/1988 | Kuwahara | 364/491 |
| 4,756,019 | 7/1988 | Szybicki | 379/221 |
| 4,764,873 | 8/1988 | Libby | 364/513 |

FOREIGN PATENT DOCUMENTS 59-226964 12/1984 Japan ................................ 364/512

OTHER PUBLICATIONS

O'Neill et al., "Substation Wiring Design Using a Computer Graphics System", Jan. 30, 1978, pp. 1-6.
Strong et al., "Computer Graphics in Power Plant Design", Feb. 1, 1978, pp. 1-7.
"PM Vision", from Applied Resources Technology, Inc., Oct. 1984.
Sufczinski et al., "Electrical Data Base Component Tracking Using Microcomputers", Proceeding of American Power Conf., May 1983.
Wada et al., "Knowledge Based Approach to Automated Pipe-Route Planning . . .", from Compint-Computer Aided Technologies, pp. 96–102, Sept. 1985.
Newell, "An Interactive Approach to Pipe Routing in Process Plants", Computer Aided Design, pp. 1080–1085, Aug. 1971.

Primary Examiner—Parshotam S. Lall
Assistant Examiner—Brian M. Mattson
Attorney, Agent, or Firm—Reed Smith Shaw & McClay

[57] ABSTRACT

A method manages cable in a building structure that includes the capabilities of automatically routing the cable between two locations in the structure, displaying the cable route, providing alternate cable routes, reporting on the cable and components of the structure, and alerting the user when percent fill capacity of the cable run is exceeded. The method also maintains the service and status of any location in the cable run.

19 Claims, 28 Drawing Sheets

FIG. 4d

From Fig. 4b

- ☐ Presets
- ☐ Deck Lines
- ☐ Trench Lines
- ☐ Cables
- ☐ Raceways
- ☐ Capacity Check Points
- ☐ Preset ID Numbers
- ☐ Cell ID Numbers
- ☐ Trench ID Numbers
- ☐ Column Lines
- ☐ Furniture

BUILDING DESIGN PARAMETERS

BUILDING NAME........:
CUSTOMER NAME........:
CUSTOMER SHORT NAME..:

USER DEFINED PARAMETERS

AUTO-ROUTING LEVEL :
DEPTH OF FILL......: /4"
FLOOR TO FLOOR
VERTICAL DISTANCE: 1

| | MODIFIED | DEFAULT |
|---|---|---|
| DECK CAPACITY | | |
| POWER: | % | % |
| COMM 1: | % | % |
| COMM 2: | % | % |
| TRENCH CAPACITY | | |
| POWER: | % | % |
| COMM 1: | % | % |
| COMM 2: | % | % |

CABLE SLACK
ORIGIN: -
DESTINATION: -

BUILDING INFORMATION

MODULE............:
CONCRETE TYPE.....:
UL DESIGN NO......:
TRENCH CATALOG NO.:
POWER COMPARTMENT
SIZE AND LOCATION.:
PRESET CATALOG NO.:

[RETURN]

*FIG. 5*

CUSTOMIZATION OPERATIONS
DEFINE REQUIRED INPUTS

- ☐ DATE
- ☐ USER EQUIPMENT
- ☐ DEFINING OPERATOR
- ☐ MANUFACTURE
- ☐ MANUFACTURE PART NUMBER
- ☐ USER PART NUMBER
- ☐ OUTSIDE DIAMETER
- ☐ CROSS SECTION DIAMETER
- ☐ CONNECTOR TYPE

- ☐ BEND RADIUS
- ☐ MAXIMUM LENGTH
- ☐ SERVICE TYPE
- ☐ ORIGIN SLACK LENGTH
- ☐ DESTINATION SLACK LENGTH
- ☐ DESCRIPTION 1
- ☐ DESCRIPTION 2
- ☐ DESCRIPTION 3
- ☐ NOTES

| MAIN MENU | RETURN |

FIG. 8

SYSTEM MAINTENANCE

Cell Block

Review/Change Raceway Service
C/C: ___
Change To: ___

PLACE SLEEVE
Next Available Sleeve No. ___
Existing Sleeve No.: ___
Usage: ___
Service: ___
Cross Sectional Area: ___ in$^2$
Closet No: ___ Length: ___ ft
Sleeve Capacity Checking: ___

REMOVE SLEEVE
Sleeve No.: ___

CHANGE SLEEVE
Sleeve No.: ___
Usage: ___
Service: ___
All Sleeves In Series? (Y/N): ___
Cross Sectional Area: ___ in$^2$
Closet No: ___ Length: ___ ft
Sleeve Capacity Checking: ___

[HELP] [RETURN]

FIG. 9

MAPROUTE PRESET INSERT ACTIVATION SYMBOLS
 Activated
 Activated Wired
 Deactivated
 Unactivated
 Unactivated Prewired
FIG. 12

ENTRY-EXIT OPERATIONS

| Place | Modify | Remove |

Parameters

DEVICE HEIGHT......:____ IN.

DEVICE WIDTH......:____ IN.

ANGLE OF PLACEMENT:____ DEG.
(OVERIDES UNDERLYING
DECK OR TRENCH)

TYPE OF SERVICE..:____

PANEL BOARD NO...:____

SLACK LENGTH......:____ FT.

ENTRY-EXIT CIC:____

MAIN MENU RETURN

FIG.13

CABLE OPERATIONS

Type  Manufacturer  DEMPart No.  User Part No.  Max Length  Run Type

Cable Type: _____
Maprte ID: _____ UserID: _____
Activation Status: [ ]
Routing Mode: [ ]

Origin: _____ Slack: _____
Destination: _____ Slack: _____
Trunk: _____ From: _____ To: _____
Vertical Sleeve: _____

Define Route
ID: _____

Change Route
Status

Enter Route

Remove Route

Cancel

HELP  RETURN

FIG.16

DEFINE CABLE SPECIFICATIONS

Cable Type _____ User Equipment Name: _____
Date: _____ Prepared By: _____

Cable Information

Manufacturer: _____  OEM Part Number: _____
Outside Diameter: _____ (nn.nnn in.) User Part Number: _____
Cross Section: _____ nn.nnn(in²) Origin Slack Length: _____ (ft.)
Connector Type: _____  Destination Slack Length: _____ (ft.)
Band Radius: _____ in.  Pulling Tension: _____
Maximum Length: _____ ft.
Type of Service: _____ (power(P),comm1(C),or comm2(D))
Description: _____

Notes: _____

| Review | Edit | Store | Create | Define Search Criteria |
|---|---|---|---|---|
| TYPE: Next | | | | Search Continue |

| HELP | RETURN |

FIG. 17

HARD COPY REPORT OPERATIONS BY FLOOR

Report Component Type
- Cable
- Capacity Point
- Entry/Exit Point
- Multi-access Device
- Preset Insert
- Splice
- Trench Compartment
- Vertical Sleeve
- Special Reports

Component Selection
- All
- Individual ____
- Range ____

Optional Component Selection Variables
____
____

Optional Cable Selection Variables
- By Status
  - Active
  - Dormant
  - Faulty
- By Cable Type ____
- By Trunk Cable ____
- By Date Placed
  - After ____
  - Before ____
  - Between ____
  - On ____

CANCEL

EXECUTE

HELP

RETURN

*FIG 20*

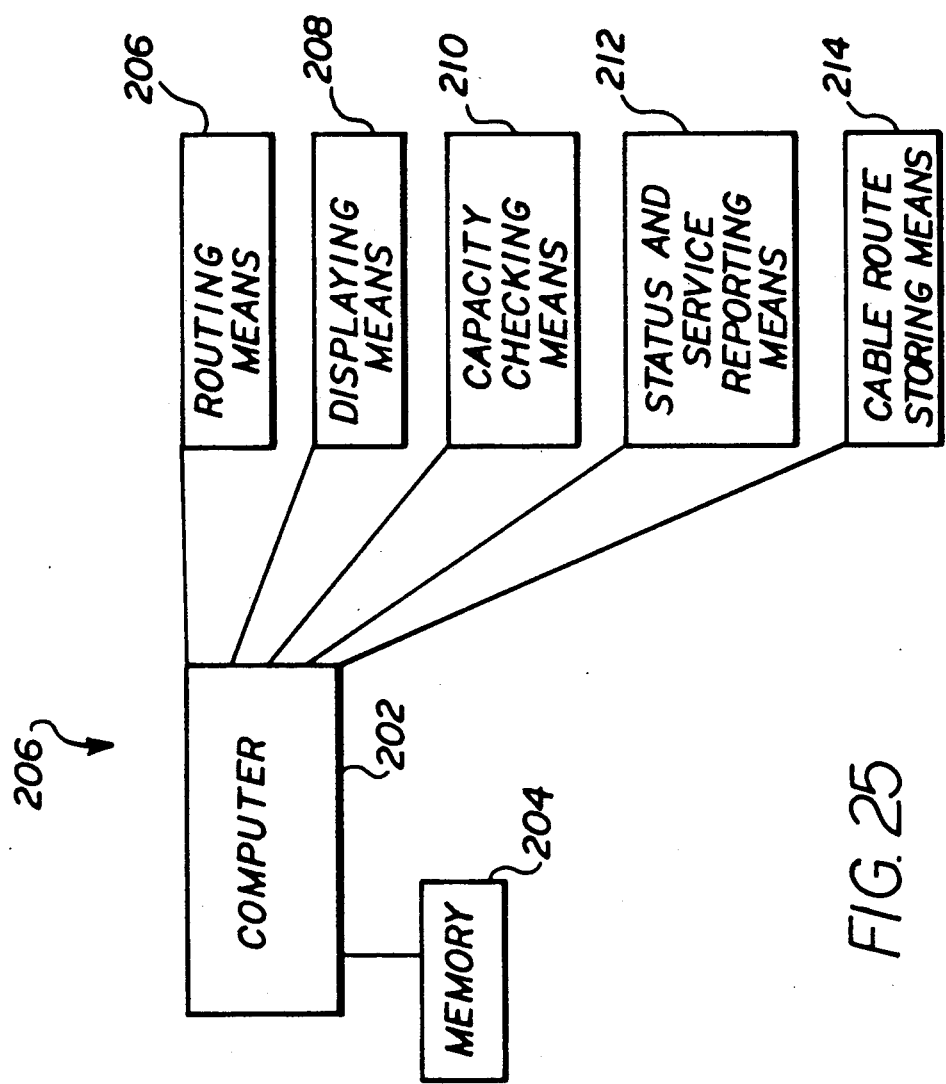

GRAPHICS-BASED WIRE-CABLE MANAGEMENT SYSTEM

This is a continuation of application Ser. No. 07/003,004 filed on Jan. 13, 1987, now abandoned.

BACKGROUND OF THE INVENTION

The present invention relates to the management of cables in building structures. More specifically, the present invention relates to the routing of cables in building structures.

The increased use of computers and a myriad of other electronic equipment in the modern office has produced an enormous increase in the number of wires and cables that must be routed to each office and desk to service such equipment. This increase in wiring/cabling load presents two problems: (1) it often taxes the capacity limits of the in-floor cellular distribution system, producing "clogged" areas that impede delivery attempts to more distant workstations and offices, and (2) it has greatly complicated the facility manager's attempts to most efficiently and most cost-effectively handle constant workstation relocations—how does he activate a particular workstation at least expense? From which electrical closet does he route particular services? Which cable route is best, in light of other workstations' considerations and possible trench or cell capacity problems? How does he find out which services are currently available at a particular workstation? Is a dormant preset that will be reactivated wired sufficiently? If not, how best to route the necessary cables?

Since the office electronic explosion is a relatively new phenomena and cable dilemmas are only beginning to be realized, the problem has not been addressed to any great extent. Current cable management systems are merely record-keeping exercises in which energetic individuals painstakingly attempt to record by hand all cable placements and removals. In some cases, personal computers have been enlisted in these simple record-keeping attempts. See, "Setroute", Bechtel Power Corporation, Gaithersberg, Md. However, none of these attempts provided graphic support to illustrate cable relative to the building structure nor aided the designer in calculating the paths or routes the cables would follow in the building structure.

Furthermore, no computer aided routing system currently exists that operates within the constraint of the routes having to follow pre-defined paths (the decks and trenches) to get from one location to another location. The computer programs or methods that aid in cable-routing are essentially free to choose from all space to form a path between two locations. See, A. Perutti, "Computer Program Solves A Cable-Routing Puzzle," EC&M, pp. 65–71, August, 1986; D. Brown, "Choosing A Wiring System," Building Economics, pp. 50–55, March, 1986; and T. Fisher, "Electrifying Floors," Progressive Architecture, pp. 116–121, February, 1986.

Previously, the solution to these problems was to strip the entire system of all cables and start over with a mass re-wire or to simply install an access floor system (computer room floor) to provide additional capacity. Both systems are costly. What is needed is a much less costly, far more cost-effective and true wire management alternative to these "band-aid" systems.

The present invention is a user friendly computer program that solves all of the above mentioned problems. It is designed to operate in the context of a structural system as described in U.S. Pat. No. 3,721,051 to Fork wherein there is disclosed a structure that is commonly used to organize cable in a building. For the purpose of better understanding the present invention, this floor structure is now briefly explained. FIG. 1 shows several components of such a structural system 10 in a floor 12 of a building. At locations throughout the floor are presets 14 whereat cabling communicates with the office space from cells 16 (FIG. 2) and can be attached to computer terminals, telephones, electrical sockets, etc. (Note only the term cable will be used hereafter, but it is representative of cable and wiring and anything associated therewith and a computer representation of a cable as opposed to an actual cable unless it is apparent from the context of the specification that an actual cable is being referred to.)

The floor 12 includes cellular decking units 17 (FIG. 2) which present cells 16 through which extend electrical cabling 21 and communication wiring 23, 25. The cells 16 present access openings 15 and 19 through which the cabling 21, 23, 25 extends into the associated preset 14. Connections to the electrical cabling 21 and to the communications wiring 23, 25 may be made within the preset 14. Reference is directed to U.S. Pat. No. 4,603,523 which illustrates a decking unit and preset. Each trench 18, 19 (FIG. 1) is divided into three compartments, an electrical portion 20, and communication portions 22 and 24 along which electrical cables and telephone, computer or other types of cabling run. [The cell path a cable may follow and/or the compartment path a cable may follow are called a cable run.] Access by the cables to different floors or to a common area occurs at a closet 26 which may have a vertical sleeve 28 that connects to other sleeves, and together form a series which extends vertically through a building. The main cabling that runs through the vertical sleeve from which individual cables peel away is called a trunk. See the glossary in Appendix I (not reprinted; see application file) for a more complete definition of terms used herein.

SUMMARY OF THE INVENTION

Accordingly, one object of the present invention is to provide an efficient cable management system that is easy to use.

Another object of the present invention is to provide a way for automatically determining the shortest route to connect a cable between any two pre-defined locations.

Another object of the present invention is to provide alternate routes to the shortest route.

Another object of the present invention is to provide analysis/inventory reports on the cables within a building.

Another object of the present invention is to provide a graphical display of the cable located within a given area.

Yet another object of the present invention is to provide a way for determining the status or service of various components in a cable structure.

Another object of the present invention is to provide the percent fill capacity at a given location in a cable housing.

These and other objects of the present invention are accomplished with a method for managing cable in a building structure using a digital computer comprising the step of inputting into a database of said computer data pertaining to the building structure and the cable, and the computer implemented steps of routing a cable through a cable run in the structure of the building; checking the capacity of a cable run when an individual cable is added thereto; and displaying the cable's location as well as the other components of the structure.

BRIEF DESCRIPTION OF THE DRAWINGS

FIGS. 4(a)-(d) is the external user flowchart.

FIG. 5 is a view of the building design parameters format.

FIG. 8 is a view of the customization operations define required inputs format.

FIG. 9 is a view of the system maintenance format.

FIG. 12 shows the Maproute preset insert activation symbols.

FIG. 13 is a view of the entry/exit operations format.

FIG. 16 is a view of the cable operations format.

FIG. 17 is a view of the define cable specifications format.

FIG. 20 is a view of the hard copy report operations by floor format.

FIG. 25 is a schematic diagram of a cable management system.

DESCRIPTION OF THE PREFERRED EMBODIMENT

Figure 1:
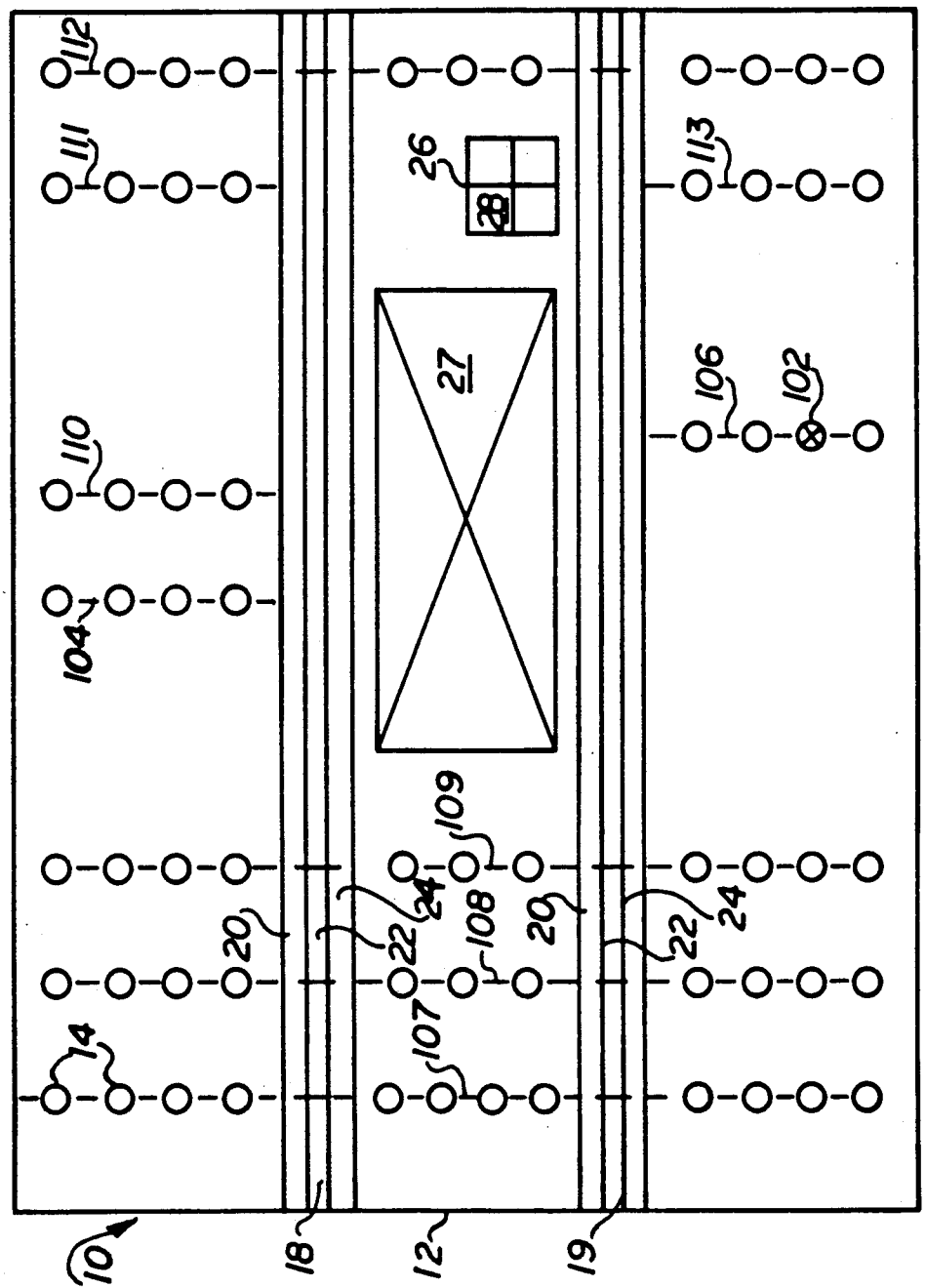
FIG. 1 is an overhead view of the structural design with regard to the cabling of a floor in a building.
Figure 2:
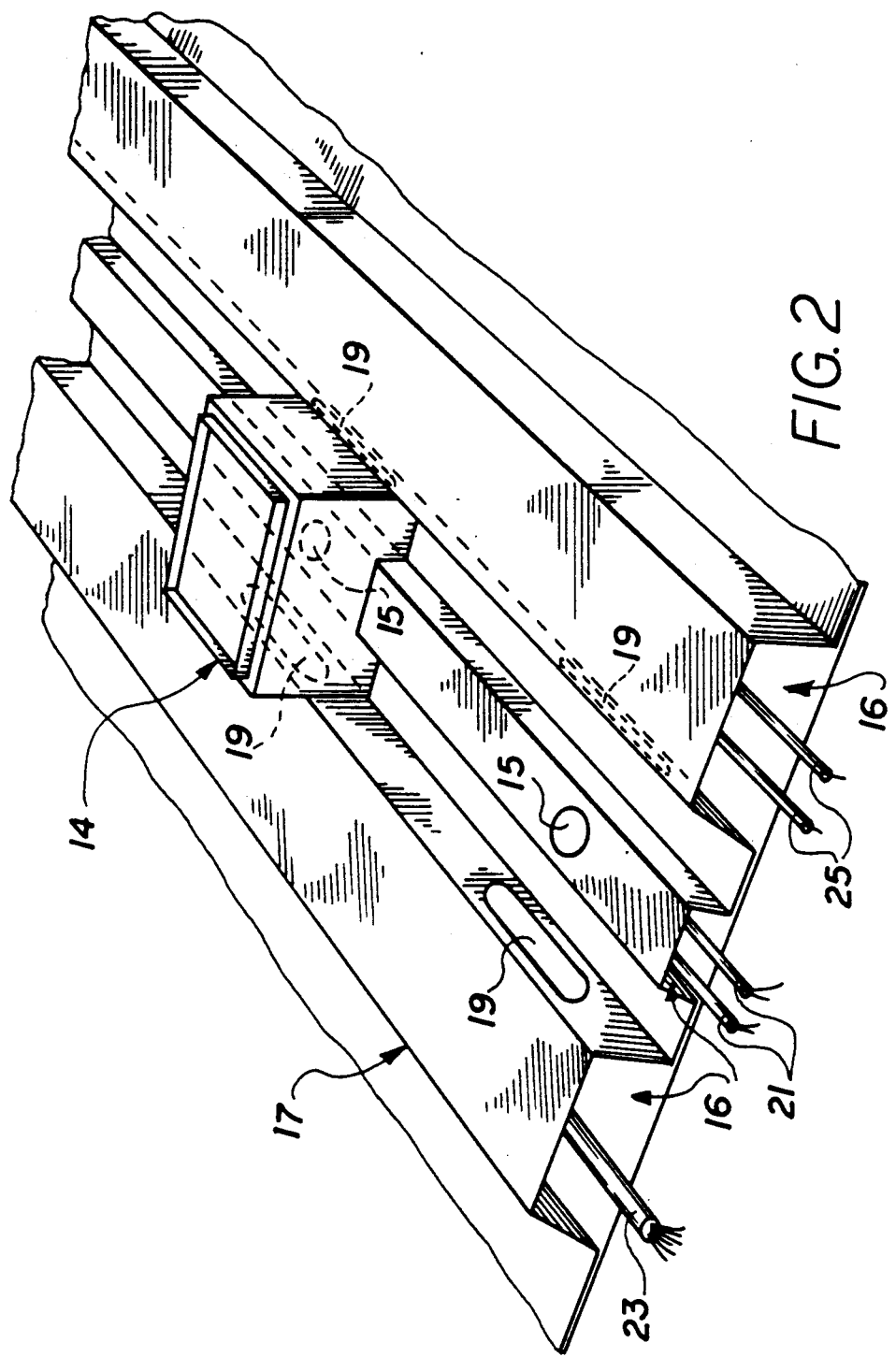
FIG. 2 is a side view of a deck.

The Maproute computer program for managing cable in a building essentially comprises the steps of: defining the structure of the building with regard to cable used therein; setting the parameters of the structure with regard to the cable; defining the specifications of each type of cable; routing each individual cable through raceways in the structure of the building; checking the capacity of each cable run when an individual cable is added; and displaying a cable's location in the structure in addition to reporting on the analysis and inventory. The first step of defining the building structure within which the cable will be located requires information pertaining to the coordinates of every structural feature important and related to the cable to be entered into a computer memory. For example, the locations of all components and the beginning and ending points of all elements of length that comprise the structure must be identified.

The next step of setting the parameters of the structure with regard to the cable requires the entry into the database of information pertaining to the cable itself. For instance, the user defined percent fill capacity of the decks and trenches with respect to the power portion, and the communication portions must be defined.

Data pertaining to the specifications of each type of cable used in the structure along with the names of each type of cable for identification in the database must also be entered therein. For example, outside diameter, cross section, maximum length, etc., for each type of cable are necessary to be entered into the database.

After all the necessary information is entered in the database, each specific cable is then placed into the structure. By identifying the origin of each cable and the destination of each cable, the Maproute computer program is able to determine the shortest route or cable run the cable may follow to connect the origin and the destination locations. It is important to note that the cable must be routed through pre-defined paths in the structure determined by the cells and compartments. The shortest path for a cable to follow to connect an origin and destination location is usually not a straight line, since, for example, a cable in order to travel from a first preset that is part of a first cell to a second preset that is part of a second cell in an adjoining room, must travel down the first cell to a compartment in a trench, along the compartment to the second cell, and up the second cell to the second preset. The routing by the Maproute program observes this constraint when connecting two locations with cable.

After the cable run is defined the computer then checks the capacity of all distinct portions of the cable run with regard to the additional cable to determine whether the percent fill capacity of any portion of the cable run has been exceeded. If the percent fill capacity is exceeded, the user is alerted.

The suggested cable run with the shortest length between the two desired points is then displayed.

More specifically, the Maproute computer program is preferably operator initialized by selection from a program menu. The database defining the building structure is created either by the direct input of structural data thereto or by selection of the relevant data from a larger building database that is commonly used in the fabrication industry. The "GKX/Other Products Bill of Material" package developed by H. H. Robertson Company in conjunction with Bechtel Power Corporation, Norwalk, Calif., is an example of a computer program that selects structural data relevant to cabling a specific building from a general building database. Moreover, the menu, graphics and databases can be designed, for example, with the aid of Intergraph packages from Intergraph Corp. See the following Intergraph Software documents for a full discussion of utilizing the Interactive Graphics Design System (IGDS) for graphics display and the Intergraph Data Management and Retrieval System (DMRS) for data manipulation and storage. The "DMRS Host Operations Language Users Guide", Product No. SLDB601, Document No. DIXD3340, defines the Data Management and Retrieval System Host Operations Language (HOL) and provides the reference information needed by the user to manipulate, access, and control a database from within an application program. The "IGDS Applications Software Interface Document" is a programmer's reference manual intended for use with the Intergraph Interactive Graphics Design Software (IGDS). This document describes software interfaces to IGDS, as well as major IGDS data structures. (It should be noted that the intergraph system only provides the tools to design a menu with graphics and data manipulation. The discussion herein describes how the package can be customized and added upon to yield a cable management system). The Maproute software package runs on Intergraph-Digital VAX computers with DEC VAX/VMS version 4.2 operating system and Intergraph IGDS/DMRS graphics and database software version 8.8.1. Intergraph, IGDS, DMRS, and HOL are registered trademarks of Intergraph Corporation, Huntsville, Ala. VAX, VMS, and DEC are registered trademarks of Digital Equipment Corporation.

Figure 3:
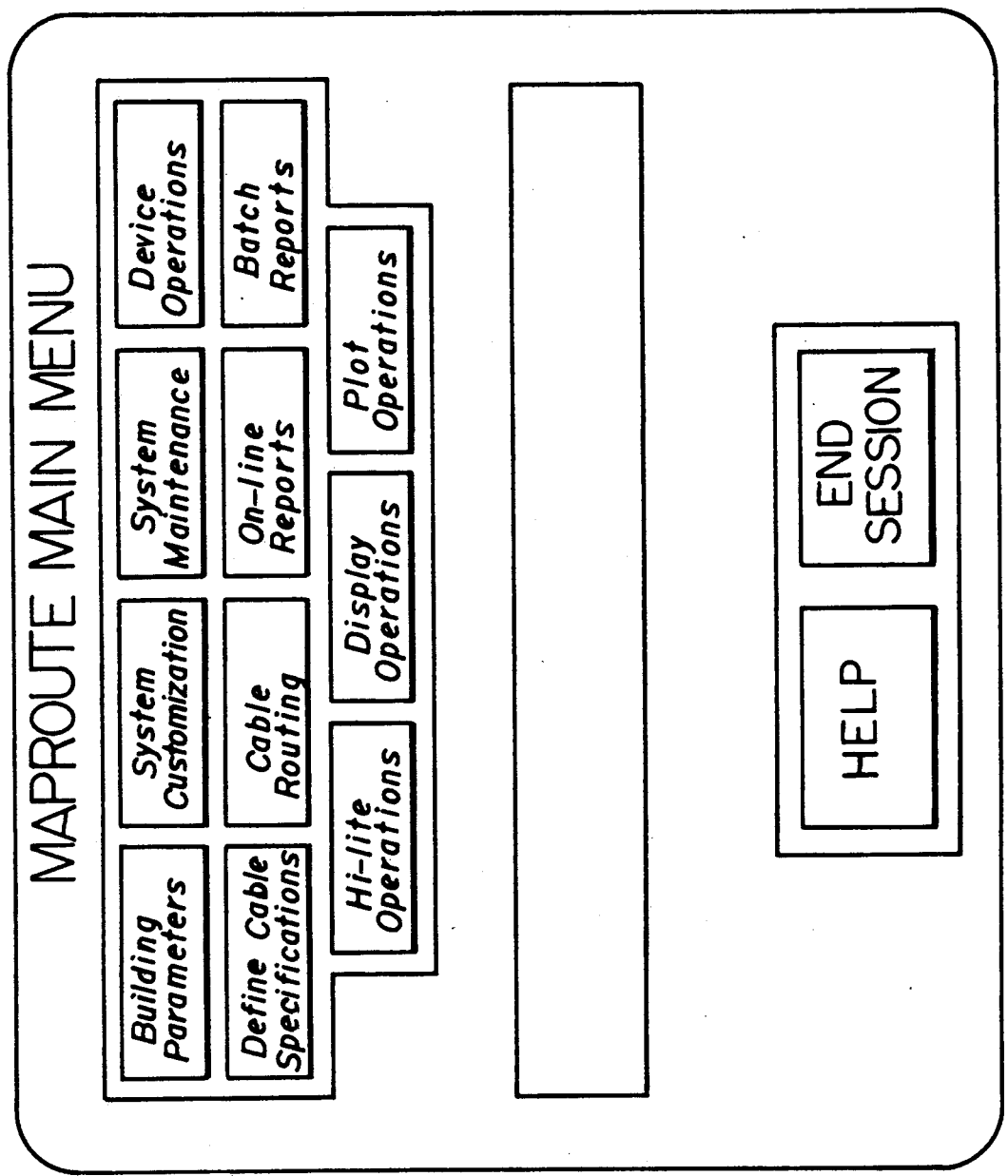
FIG. 3 is a view of the Maproute main menu display.
Figure 4A:
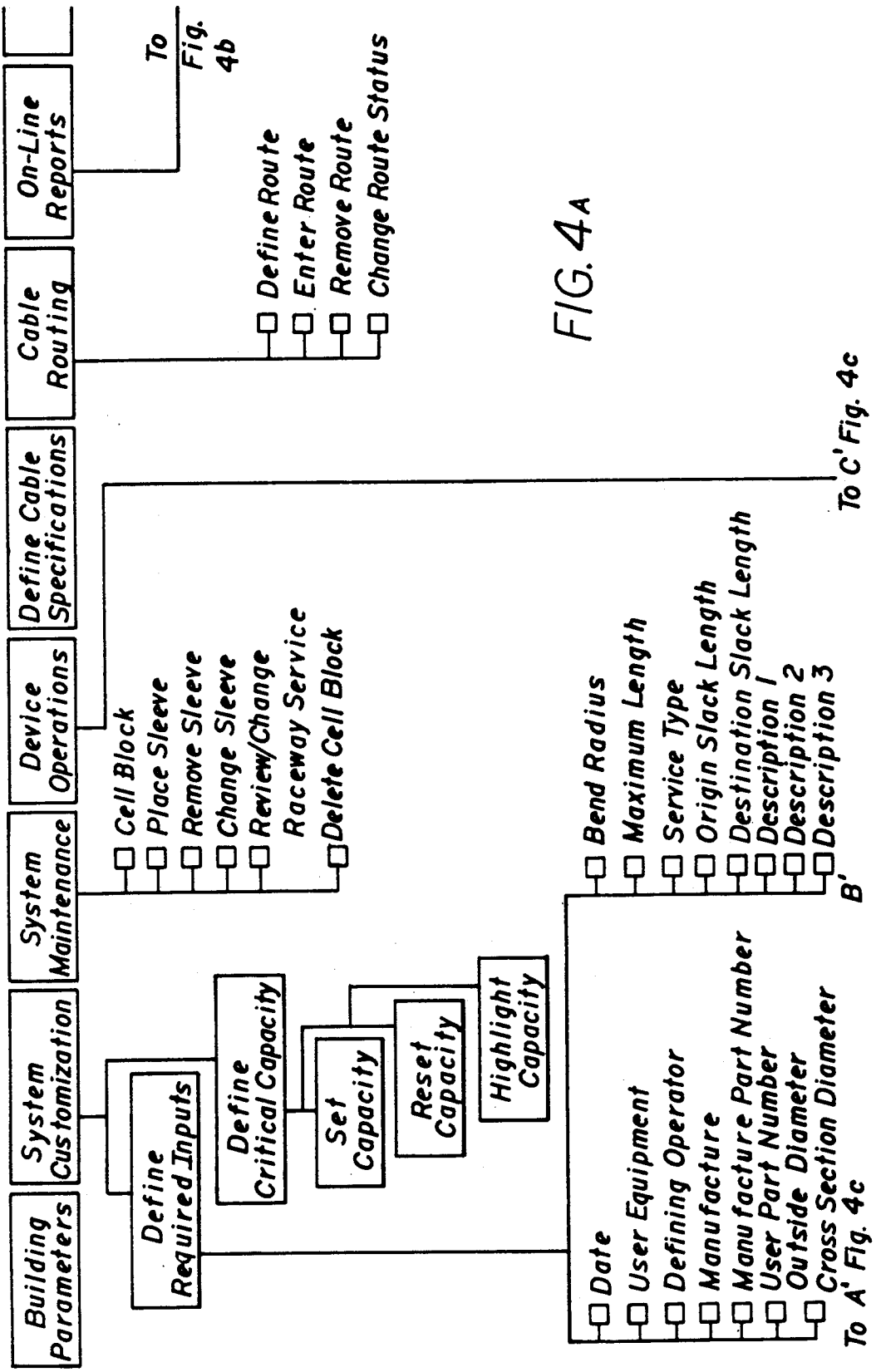
Figure 4B:
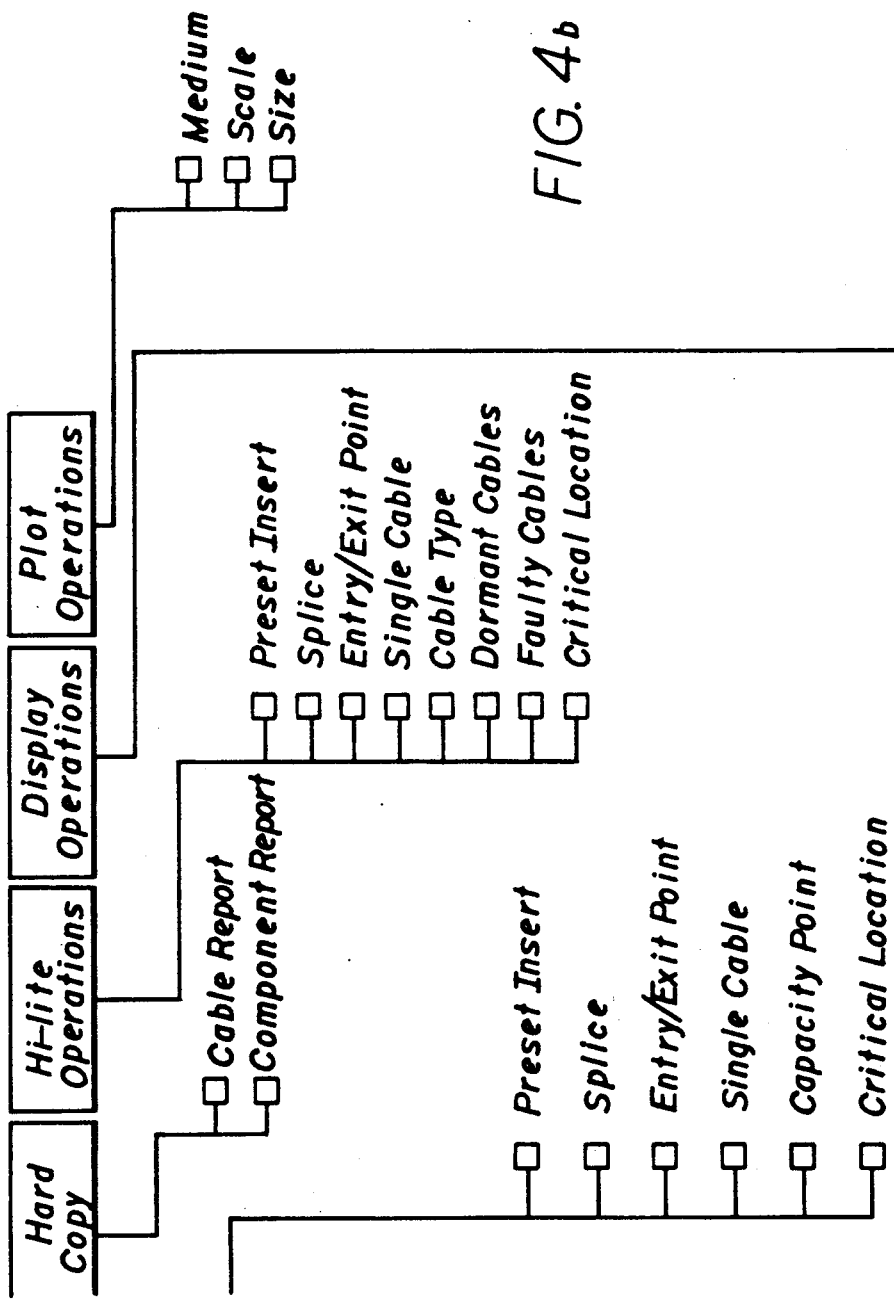
Figure 4C:
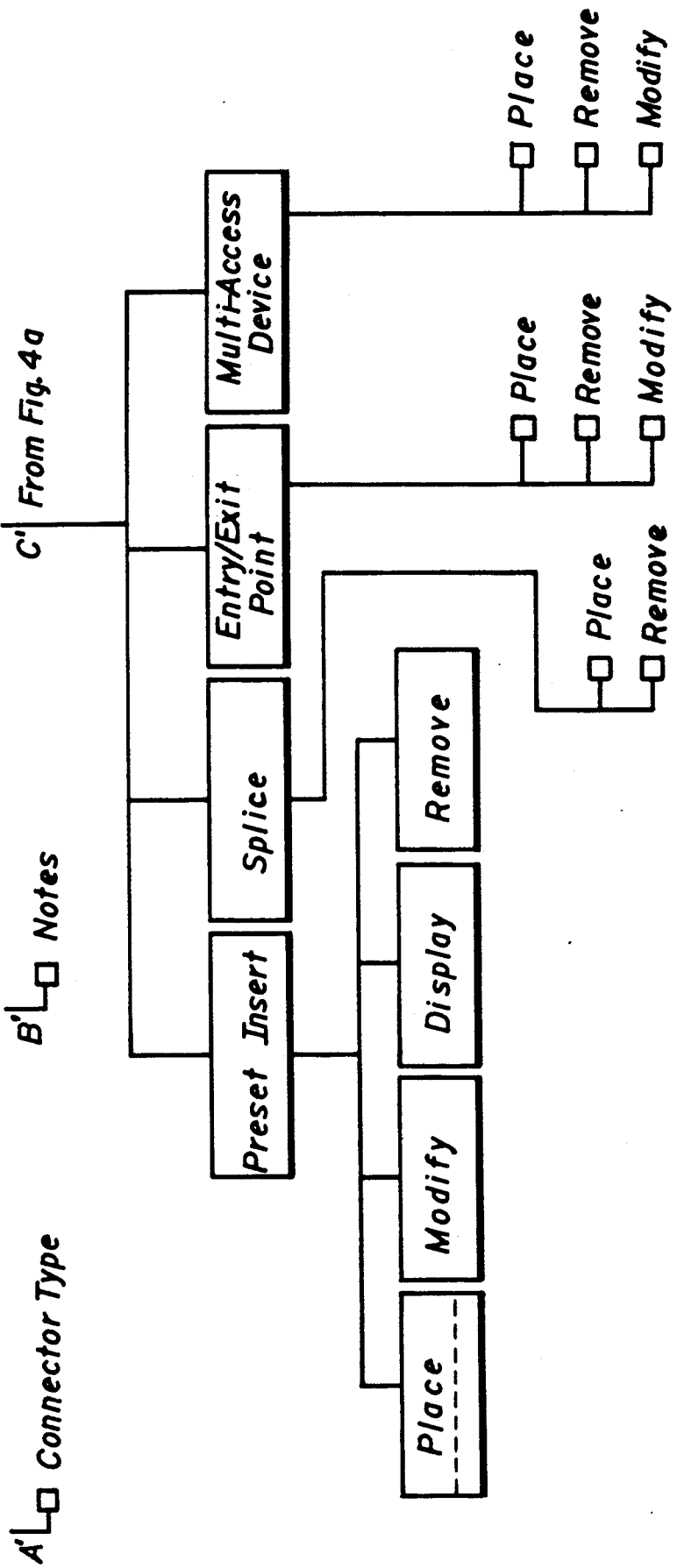

From the program menu, specifically the Maproute main menu, an operator has the choice of selecting essentially eleven subroutines (see FIG. 3). These are (1) Building Design Parameters, (2) System Customization, (3) System Maintenance, (4) Device Operations, (5) Define Cable Specifications, (6) Cable Routing, (7) On-line Reports, (8) Batch Reports, (9) Hi-lite Operations, (10) Display Operations, and (11) Plot Operations. See FIGS. 4a, 4b, 4c and 4d showing the flow-chart with regard to external user access. A discussion of the above subroutines now follows.

When a user accesses the building design parameters option of the Maproute main menu, the building design parameters format appears on the display screen. The user is then able to input and store data relevant to the building structure. This data includes power and communication capacities in a trench or a deck, floor to floor vertical distance, cable slack, and other information concerning the design of the building in addition to cable-routing default values. FIG. 5 shows the building design parameters format. Information supplied to the building design parameters option is stored in the building default file. (A more complete discussion of the files and databases of Maproute appears below). After the necessary building parameters are inputted, these values are sent to the display for review and/or modification. Any updated values are received and the numeric fields of the data inputted are validated by calling a subroutine "check it out." An error issues if validation is not passed. If there is no error, then the building file is updated with the new values of the parameters.

The subroutine "check it out" determines if a character string can be represented numerically. The procedure it follows to do this is to obtain the length of a character string being reviewed, then to determine if all the contents are valid numeric characters, and finally to issue an error code if an invalid character is found.

Figure 6:
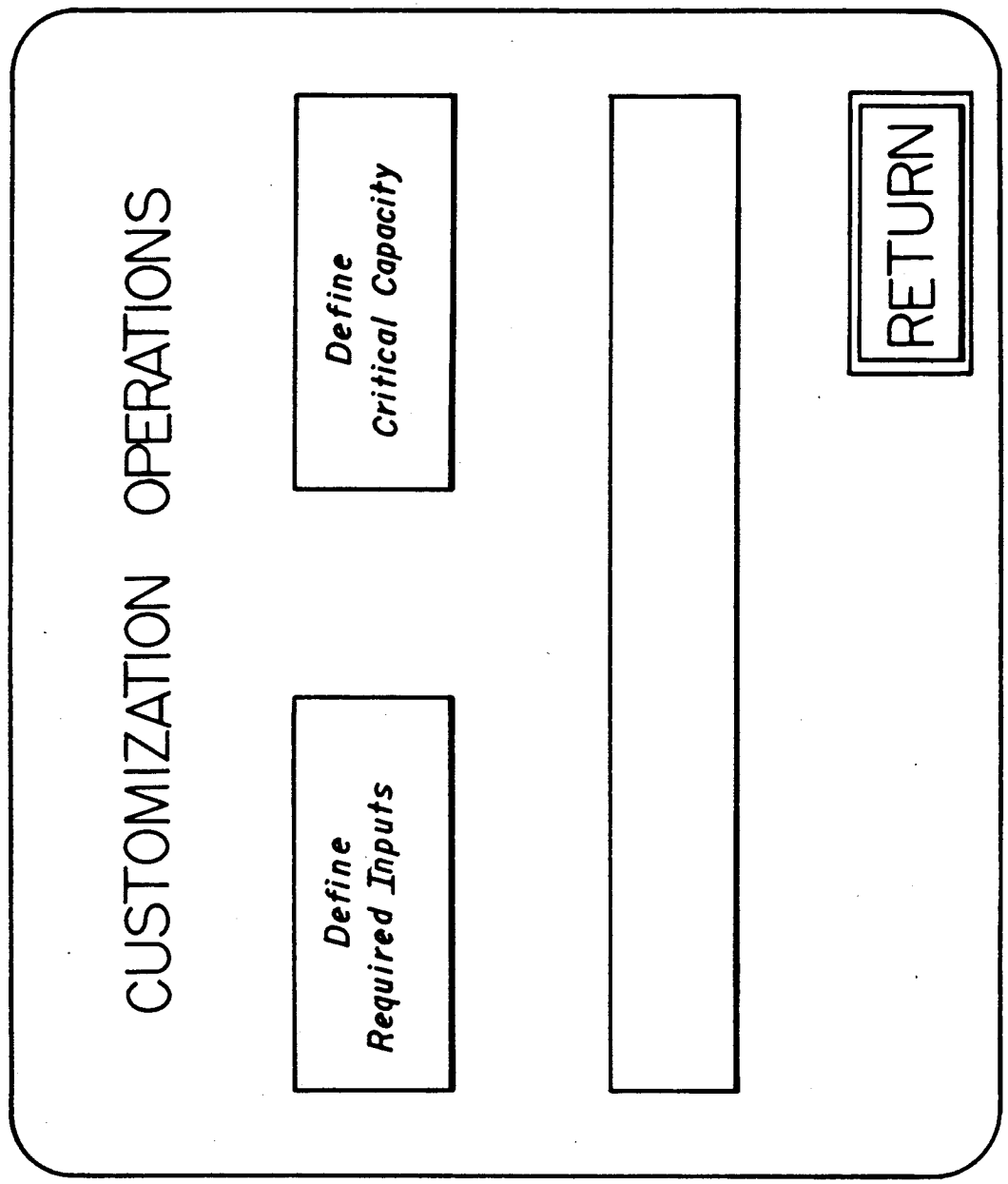
FIG. 6 is a view of the customization operations format.
Figure 7:
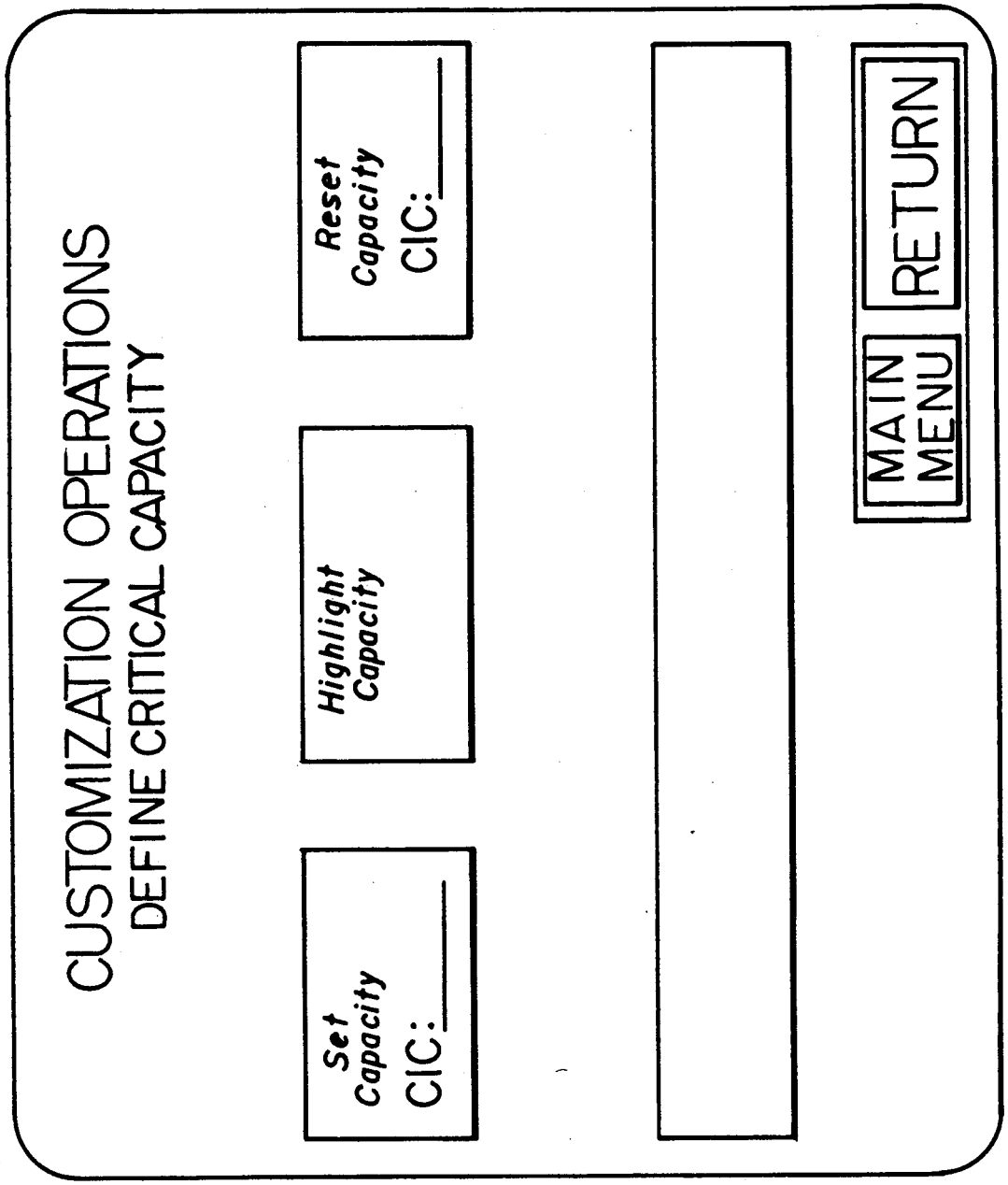
FIG. 7 is a view of the customization operations define critical capacity format.

Choosing the system customization option (see FIG. 6) allows the user to define required inputs or define critical capacity. The user, by choosing to define critical capacity, is able to specify checkpoints which are deemed critical throughout the structure. These checkpoints are highlighted and information, such as percent capacity fill, is brought to the attention of the user as the cable management occurs. Critical checkpoints are inserted into the system by a computer mouse being moved over the Define Critical Capacity box of the system customization option and being digitized. Then the mouse is moved over a specific location on a cable run in the graphics display of the structure and digitized once again while the system is in the customization operation critical capacity mode. See FIG. 7 for the Define Critical Capacity format. In the Highlight Critical Capacity format, all capacity segments that are defined as critical are highlighted. The procedure the program follows to do this is first to search the graphics database for the capacity segments in question, then to determine these capacity segments' current status, and finally to highlight the capacity segment if its status is critical. In the placement of a capacity segment at a given point on a raceway in the graphics database and the PCWC database, the program first causes the PCWC database to be opened. A check is done to ensure that the desired point of the capacity segment is on a valid raceway. After the point is determined to be on a valid raceway, the search of the graphics database for the cell or compartment shape a given point lies on is carried out. The width and angle of the cell or compartment along with the end points of the new capacity segment are calculated. The capacity segment is then written into the graphics database and the CIC code associated with the capacity segment is determined based on the raceway it lies on and the next available number for that raceway. The current capacity for the capacity segment is calculated by searching the graphics database for all the cables which intersect the capacity segment and incrementing the current capacity at the cross-sectional area of each cable which intersects it. Finally an occurrence for the capacity segment is written into the PCWC database.

If the user wishes to define required inputs, the user first digitizes the mouse in the Define Required Inputs box of the system customization option, after which the Define Required Inputs format appears on the display screen. Then the user digitizes the mouse in a box alongside a desired input in the Define Required Inputs option (See FIG. 8 for the define required inputs format). The inputs that can be defined as required include user equipment, defining operator, manufacture, manufactural part number, user part number, outside diameter, cross-section diameter connector type, bend radius, maximum length, service type, origin slack length, destination slack length, description one, description two, description three, and notes. Some of the required inputs are automatically set and cannot be removed from required status. These include outside diameter, cross-section diameter, and maximum length which are necessary for the system to design routes effectively. By digitizing the mouse in a box while in the required inputs format, a user is required to supply that information to the system (in the Define Cable Specifications format) before a specific cable can be added to the system. If certain information is required in the Define Cable Specifications, and it is not supplied, when the user attempts to store the partially completed cable specifications information, the system rejects it. Only when the required additional information which corresponds to the required inputs is supplied is the user be able to store the information.

The Define Cable Specifications format provides parameters for a given type of cable that, as shown in FIG. 17, is to be used in the building. Each cable type used in the building must be defined. When a cable being placed into the building is identified to be of a certain cable type, the cable specifications for that type of cable is automatically attributed to it. The information supplied under the cable specification format is stored in the code type database. In the Define Cable Specifications option the code type database is opened and the size of each item in the database is determined.

The inputs or fields which are required and which are optional (from the define required inputs option) are determined. Then which function of review cable type, edit cable type, store cable type, create cable type or search for cable type that is to be performed, is determined. The parameters of the cable are subsequently obtained and the information in the code type database is updated with the new parameters if the storing function is chosen. If the create function is chosen, a new slot in the database is allocated to accept information from the display. This information is in turn validated with regard to the numeric fields associated therewith and is reviewed to insure each of the required fields have been addressed. This is accomplished by the subroutine MAP020CHK being called by the Define Cable Specifications subroutine. The subroutine MAP020CHK checks for addressing of all required input fields for the Define Cable Specifications functions. The procedure it follows is to first scan the array of required fields and then to issue an error if the required field is not addressed.

If the user accesses the system maintenance option of the menu, the user has the ability to modify the stored structure of the system. (Note, as described above for the system customization options of define critical capacity or define required inputs, to access any option on the menu or any option on any format, all that is necessary to do is to digitize the computer mouse when it is within a predefined region of the desired format or menu.) See FIG. 9 for the system maintenance format that appears on the display screen. Under the system maintenance procedures, the user has the ability to block a cell, remove a block, place a sleeve, remove a sleeve, change a sleeve or to review/change cable run service. By choosing to block a cell, the user places a mouse over that portion of the compartment or cell which the user wishes to block and digitizes it while in the block cell option. This then causes a possible path to be interrupted and prevents any routes from passing therethrough. The user places a sleeve by digitizing the location on the graphics display where the user wishes the sleeve to be placed. Also needed to place a sleeve is information concerning the cross-sectional area of the sleeve, the type of service it provides, the sleeve number, the closet number associated therewith and the sleeve length. To remove a sleeve, the user places the CIC code of the sleeve that is desired to be removed in the remove sleeve box and enters it. The program then removes the sleeve. To change a sleeve, the user moves the mouse to the sleeve on the display the user desires to modify while in the change sleeve option, and inserts the new information to modify the sleeve. The review/change raceway service allows the user to change the service of a specific raceway from power to communication or from communication to power by placing a mouse over the desired rep line under the system maintenance cable run service mode. The cell block, place sleeve and remove sleeve options modify the graphics database. The place, remove and change sleeve options modify the VCAP database and the review/change cable run service modifies the PCWC database. Note that several options, such as the Delete Cell Block do not appear in FIG. 9. However, they are part of the menu by way of roll-through boxes. Roll-through boxes are just boxes in a format which, when a mouse is digitized in the box, the contents or option in the box changes. (The Intergraph package accommodates this capacity.) There are several of these types of roll-through boxes found throughout the specific menus or tutorials of the Maproute program. If the block cell option is chosen then a cell block is placed perpendicular to a cell raceway, causing it to be divided into two unique cell raceways. This is accomplished in the following way. The location of the cell raceway is inputted. The cell raceway service is then determined from the PCWC database and the underlying deck is obtained. Next, the angle at which the cell block is to be placed is calculated. The subroutine displays an error and the subroutine terminates if any cables pass through the point at which the cell block is being placed. The cell block representation is then placed in the graphics database with the cell raceway being bisected into two at the cell block intersection point. Finally, any preset which accesses the new cell raceway is identified and adjustments are made accordingly. If the delete block option is chosen, then the block that separates two cell raceways is deleted and the two cell raceways are joined together to become one cell raceway. This is accomplished in the following way. The location of the cell block is inputted and the underlying deck is obtained. The two cell raceways that were bisected by the cell block are then obtained. An error message is issued and the subroutine is terminated if the two cell raceways' service is not of the same type. Next, the cell block is deleted from the graphics database and the two cell raceways are joined into one, and any presets that may have accessed the two cell raceways are adjusted.

If the review/change raceway service option is chosen, then the following procedure occurs. The service change and location of the raceway associated therewith is inputted and any capacity identifiers located on the raceway are saved. An error message is issued and the subroutine is terminated if there are any cables passing through the raceway. Next, the type of service in the PCWC database is replaced with the new service, and any capacity identifiers which are located on the raceway are updated. Also, any entry/exit devices which access the raceway are adjusted accordingly.

If the place sleeve option is chosen, then the desired location as well as the other information identified above is inputted. The vertical sleeve information is then placed into the VCAP database and the graphics database.

If the update sleeve option is chosen, it is first determined whether the sleeve is used vertically or for a home run. Then the information is updated in the VCAP database.

If the delete sleeve option is chosen, then first a check is made to see if any cables pass through the sleeve. If there are cables in the sleeve, an error is issued and the subroutine is terminated. If there are no cables, then the information about the sleeve is deleted from the VCAP database and the graphics database.

Figure 10:
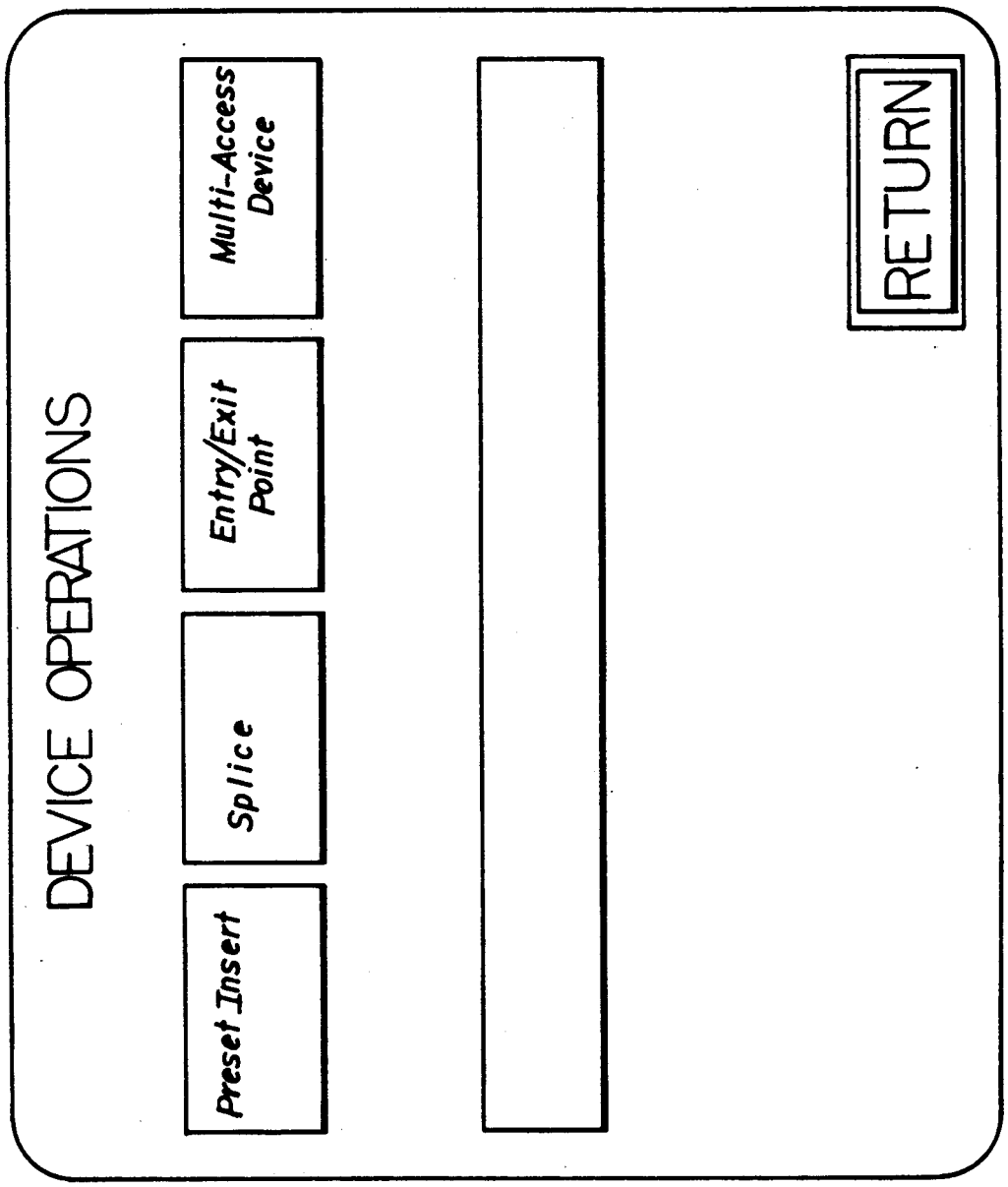
FIG. 10 is a view of the device operations format.
Figure 11:
FIG. 11 is a view of the preset insert operations format.

Under the Device Operations format (see FIG. 10), the user has the ability to modify specific permanent components of the overall structure. These include presets, splices, entry/exit points and multi-access devices. In Preset Operations format (see FIG. 11), a preset may be placed, modified, displayed or removed. This is done by moving the mouse to the location on the graphics display where the modification is desired to be effected, and activating the respective operation. In addition, under the preset operations, the preset which is being operated upon also must be identified as to whether it is activated, activated wired, deactivated, unactivated or unactivated prewired (see FIG. 12, which shows the symbolic representation of the cable status). An activated preset is one in which there is access from the floor into a cell. An activated wired preset is one in which cables are located within a preset accessible through or communicating with a floor. The deactivated preset is one in which a plastic plate is placed over a hole in the floor connected to the cell. An unactivated preset is one in which the cement of the floor has not been drilled through to allow access to the preset. An unactivated prewired preset is one in which there is cable running through the cell, but the concrete has not been removed to provide access.

The procedure the preset insert operation follows is to first verify that a valid parameter exists, and then to determine which preset operation is to be performed. The place operation can be activated to place a preset or add an afterset to the graphics database file and the PCWC database. The procedure of the place operation program is the following. The point on the raceway where the preset or afterset is to be placed is inputted, and the point is verified as being on a valid cell raceway. The graphics database is then searched for the cell shape the given point lies on. The width and angle of the cell is calculated and the raceways the preset or afterset access are determined. If an afterset is being added, then it only accesses the raceway it lies on. If a preset is being placed, then the subroutine preset center is called. Finally, the place preset subroutine is called to place the preset or afterset into the graphics database and the PCWC database.

The preset center subroutine determines the preset insert's center based on the cell type it lies on and also finds the raceway it can access. The procedure the subroutine follows is to first locate another preset which accesses the selected raceway. The subroutine displays an error when no presets are found. The number of compartments the preset can access are also determined. A fictitious line three-quarters of the width of the cell is then formed, and the search for the cell raceways which intersect this line is carried out. The raceways which intersect the line are stored. Finally, the center of the preset is calculated based on the raceways it accesses and the cell type.

The place preset subroutine writes the preset or afterset to the graphics database and the PCWC database with the current parameter values. The procedure that the subroutine follows is to first obtain the next available preset CIC code from the PCWC database, then write the preset CIC code and the parameter values thereof into the PCWC database. Next, a six inch circle representing the preset or afterset is written into the graphics database as well as the preset activation symbol. Finally, the preset CIC code is written to the graphics database and is assigned a location corresponding to three inches below the center of the preset.

If the modify preset option is chosen, first the preset's CIC code is inputted and verified. The parameter values in the PCWC database are then updated with the modified information. A check is performed to determine if the activation status has been modified, and the preset with the given CIC code is located. Next, the activation status in the graphics database is modified by calling the activation status subroutine. Finally, if the status of a preset is modified to deactivated, the status of any cables accessing the preset are changed to dormant in the cable runs file.

The activation status subroutine modifies a preset's activation status graphically in the PCWC database. The procedure it follows is to first input the activation status. This is followed by finding the preset insert in the PCWC database. Then the preset insert's activation status is modified in the database. Next, the graphics database is searched for the activation symbol. When the activation symbol is found, it is deleted. Finally, the modified activation symbol is written into the graphics database.

In the display preset option the CIC code of the preset is inputted, the preset's current activation status is obtained along with the slack length and activation status and is displayed to the user.

In the remove preset option, the preset is removed from the graphics database and the PCWC database. The remove preset subroutine first requires the CIC code of the preset to be inputted. Then the subroutine requires the cable runs database to be opened and checked to ensure no cables exist whose origin or destination equals the given preset CIC code. If a cable is associated with the preset, a display error occurs. The PCWC database is then checked to see that no MAD is associated with the given preset. If there is a MAD associated with the preset, then an error occurs. Finally, the preset CIC code is located in the PCWC database, and the preset is deleted therefrom. The preset is also located in the graphics database and deleted therefrom along with the activation symbol.

In Entry Exit Operations format, as shown in FIG. 13, the user may place, modify or remove a pull box. This is done, as explained above, by moving a mouse over the desired operation box in the entry/exit format and digitizing it, and then moving the mouse onto the location of the graphics display where the pull box is desired to be placed, modified or removed and digitizing again. Also required to effect this option is to provide the parameters of pull box height, width, type of service, angle of placement, slack length and panel board number. The data supplied is stored in the PCWC database and the graphics database. If the place entry/exit option is chosen, then the following procedure occurs to place an entry/exit device in a cell or compartment and to enter information about it into the PCWC database. First, the lower left corner location of the entry/exit device and its height, width and placement angle are inputted along with the type of service, the panel board number and the cable slack length. Then, the location of the underlying cell or compartment is obtained. If the input placement angle is not given, then the placement angle by default will be that of the underlying deck or trench. Next, the coordinates of the entry/exit device from its height, width, placement angle and lower left corner are determined. All cell and compartment raceways that can access the entry/exit device are placed in the PCWC database. The service, panel board number and cable slack length are also placed into the database. Finally, the entry/exit device representation appears as a rectangle on the display.

If the delete entry/exit option is chosen, then the following procedure occurs. First, it is determined whether the entry/exit device has a MAD associated with it. If there exists a MAD, an error is issued, and the delete subroutine is terminated. If there is no MAD associated with the entry/exit device, then information pertaining to the device is deleted from the PCWC database. Also, any information associated with the entry/exit device is deleted from the graphics database. If the modify entry/exit device is chosen, then first it is determined what information is to be changed. Then all raceways that access the entry/exit device are found if the type of service is being changed. Finally, the modified information is updated in the PCWC database.

Figure 14:
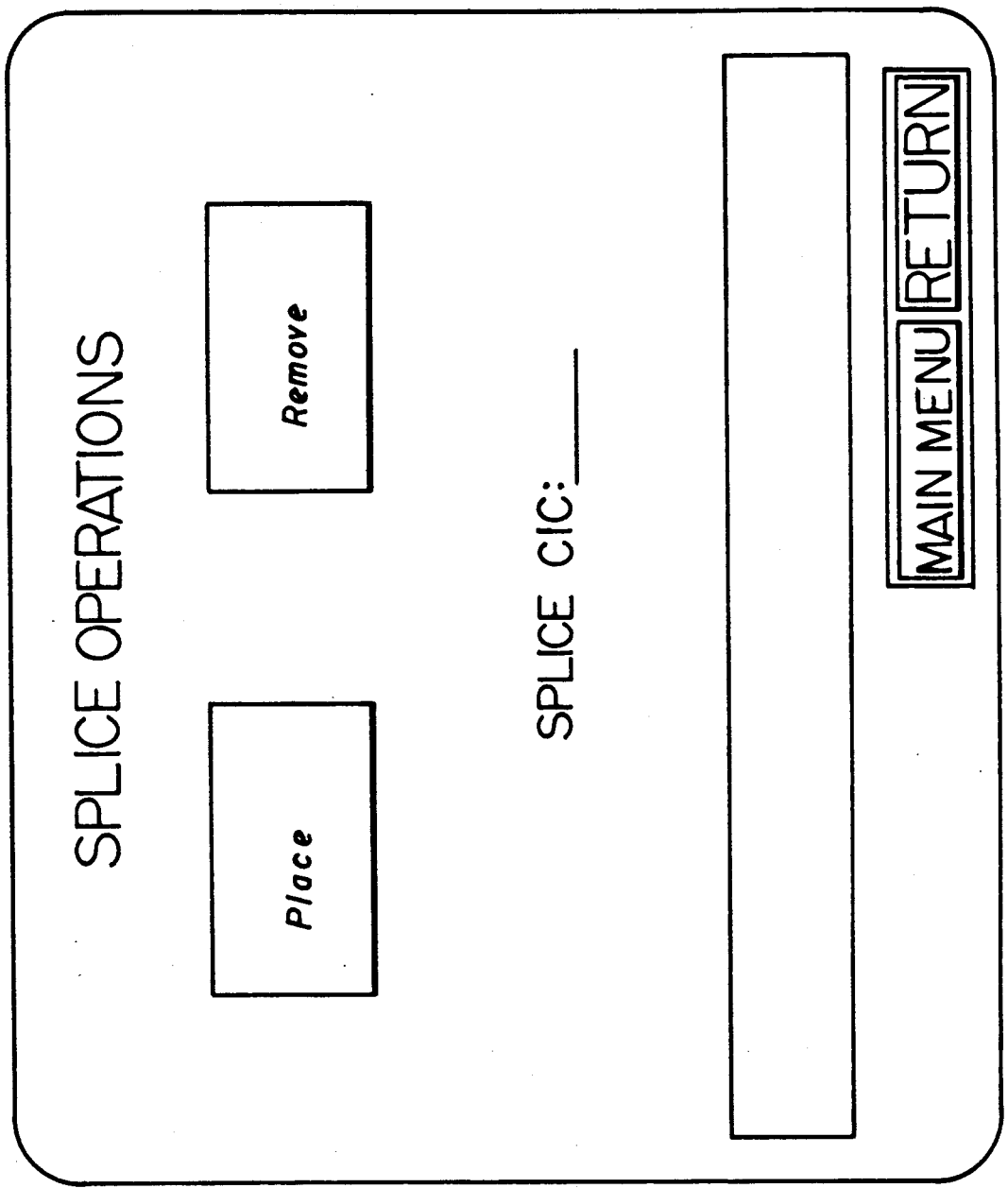
FIG. 14 is a view of the splice operations format.

The user may place, identify or remove a splice under the splice operations option by moving a mouse to the desired location on the graphics display and activating the mouse after choosing the place or remove option of FIG. 14. As defined before, a splice is the point where one cable branches off into two or more cables. If the place splice option is chosen, the following procedure occurs. First, the location of the splice in the underlying compartment raceway is input. Then, the information about the splice is placed into the PCWC database. The splice is represented as a circle with a two inch radius in the graphics database.

If the delete splice option is chosen, the splice is first checked to determine whether a MAD is associated with it. If there exists a MAD or cable associated with the splice, an error is issued and the delete splice subroutine is terminated. If there is no MAD or cable associated therewith, the information about the splice is deleted in the PCWC database and from the graphics database.

Figure 15:
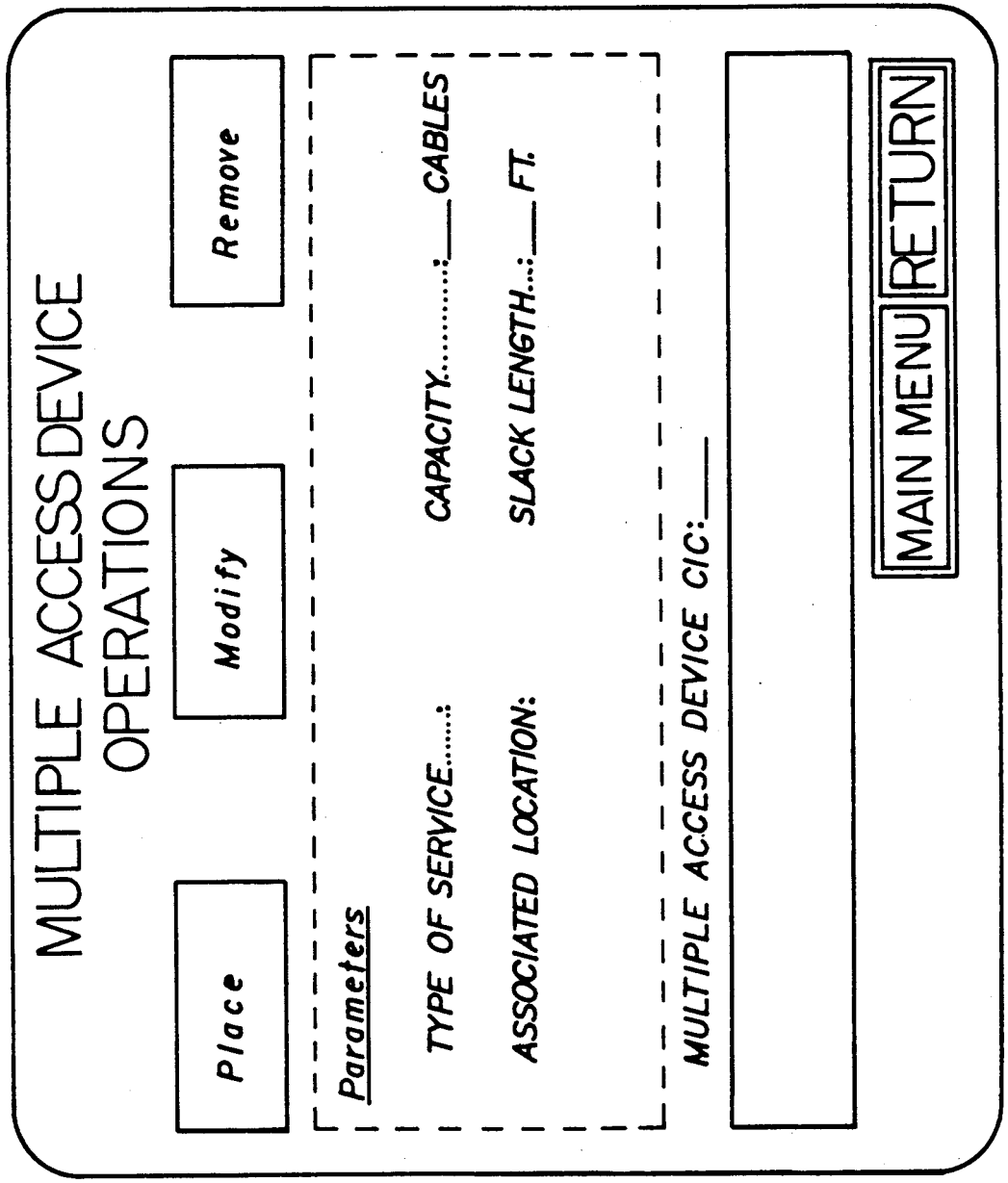
FIG. 15 is a view of the multiple access device operations.

In the multiple access device (MAD) operations option (see FIG. 15), a user may place, identify, modify or remove a MAD. This is accomplished in the same way in which a splice is placed or removed. In addition, the parameters of type of service, associated location, capacity and slack length are necessary to identify a MAD. The difference between a MAD and a splice is that the MAD has more data associated with it and is limited in the number of cables that may branch off from a single cable. It should be noted that the information supplied under any option of the device operations format is stored in the PCWC and the graphics database. If the place MAD option is chosen, the following procedure occurs. First, the location of the MAD element, the type of service, the MAD associated device type, the capacity and the cable slack length are inputted. Then, the owner of the MAD, and the coordinates of the MAD from the underlying associated device are determined. If the associated device is an unactivated preset, then it is activated by the subroutine activation status (discussed below) being called. Next, the service, capacity and cable slack length are placed into the PCWC database, and the MAD is placed into the graphics database and represented as a rectangle rotated 45°. Finally, the raceways that can access the MAD are determined if the associated device is a preset.

The activation status subroutine modifies a preset's activation status graphically and in the PCWC database in the following way. The activation status is first input. Then the preset is found in the PCWC database and the activation status thereof is modified. The graphics database is searched for the activation symbol and deleted. Finally, the modified activation symbol is written into the graphics database.

If the delete MAD option is chosen, it is first determined whether the MAD is associated with a preset. If there is an associated preset, any capacity representation identified therewith is removed. The MAD is then deleted from the PCWC database in the graphics database.

If the updata MAD option is chosen, then the type of information to be changed is determined. If the service type is being changed and the associated device is a preset, then all raceways that can access the MAD are found. From this, old capacity representations are removed and replaced with new ones to reflect the service change. Finally, the information is updated in the PCWC database.

The actual routing from an origin point to a destination point can be carried out by choosing the cable routing option on the Maproute main menu. After cable routing is chosen, a cable operations format, as shown in FIG. 16, appears on the display. [Note, the activation status and routing mode boxes are roll-through boxes.] The activation status box contains dormant, active or faulty conditions, and the routing mode contains auto or manual options. Whatever the boxes contain at the time another option of that format is activated is the status or option that is entered.

To execute the routing procedure first, the origin of the cable must be identified. In order to choose the origin, the mouse is moved to the location on the display screen coinciding with the origin point and digitized while in the cable operations format. The graphics database is then searched through to locate that point which coincides with the location designated as the origin. Once the location is found, a pointer associated with that location in the graphics database links to the PCWC database and identifies the corresponding CIC code. The CIC code is then filled in at the origin block, along with the slack associated therewith. In a similar manner, the destination location and the destination slack is identified. In addition, if desired, the trunk or vertical cable from which a specific cable possibly emanates can also be identified the same way along with the number of individual cables running between the origin and destination. By designating the trunk or vertical cable from which a specific cable being routed branches from, the vertical sleeve associated therewith is also identified.

When the define route mode is activated, the following steps occur to determine various routes which connect the origin and destination points. These steps are taken with the constraint that a route may not enter and exit a trench more than one time or cross it if in it. In the operation of the cable routing routine, the cable run corresponding to the origin and the cable run corresponding to the destination and the respective elements of length they are part of are stored in memory. The routing subroutine program then determines whether there is any intersection between the two elements of length. This is done by calculating the equations that describe the paths corresponding with the origin and destination elements and solving the equations simultaneously. This first comparison corresponds to a level one search of the route procedure. The program then proceeds to a second level search which means the program determines all the elements of length that each cable run of the origin and destination respectively, intersect. Intersection is again determined by solving simultaneously the two equations representing the paths of each element of length. More specifically, in this search level and in all subsequent search levels, a memory array is utilized wherein each element has beginning and ending coordinates stored therein. The memory array is created from the graphics database with the information concerning the beginning and ending coordinates of each element of length, but without any other information such as pointer information. This memory array is for the purpose of spreading the intersection search. The element of length that is known is used to start. Each element of length stored in the memory array then has the equation defining its path calculated and solved simultaneously with the equation defining the known element's path, that is, the element of length associated with the cable run that connects to the origin. In subsequent level searches, instead of the origin other elements are substituted as the known element. Each element which intersects at some point the known element's path is stored in the memory array. This procedure is performed also for the destination element. The intersecting elements of length of both the origin and destination elements of length are then compared to determine whether there are any common elements. This process is repeated through a total of seven levels. When a common element of length is identified between the origin element of length and the destination element of length, the path created to arrive at the common element of length from the origin is connected to the path followed to reach the common element of length from the destination. In this way, a route is created connecting the origin and destination. When there is an actual connection identified, the level of search of the connection is equal to the sum of the origin level search and destination level search minus one since the elements of length of the highest level of search of the origin path and the destination path are actually the same element of length. After all possible connecting routes are determined, each length is calculated, and the routes are sorted from shortest length to longest length. The shortest route is presented first to the user for possible use. If the user rejects that route, then the next shortest route or alternate is presented, and so on, until an acceptable route appears to the user. At the same time each route is calculated, the percent fill capacity at all points along the determined connecting route is also calculated. If the percent fill capacity exceeds the defined value for the system, the user is alerted. The percent fill capacity is simply determined by adding the square inches of the cross-sectional area of the cable being routed to the amount of square inches already occupied by other cables in a cell or compartment. See Appendix III (not re-printed; see application file) for the routing subroutine program. During the operation of the routing program once a complete route is found, logistic checks are performed via subroutine autochecks. Subroutine autochecks performs necessary checks on the complete route in order to validate that route. The autocheck subroutine performs three major checks on a complete route. First, it eliminates any lengthy routes found to be longer than the defined maximum length of the active cable type. It also eliminates any self-crossing routes which are those routes where one segment crosses over another segment of the same route. The autocheck subroutine also checks for the route using the same trench more than once, and disregards the route if a valid route has already been found. A valid route is defined as one that runs from the origin to the destination without any capacity problems and also passes the two previous checks. The capacity check performed on each segment of a complete route is carried out by the capacity check subroutine. The capacity check subroutine finds all capacity lines residing along the segment of the route in question. For each capacity line, the subroutine determines if the addition of another cable will cause a capacity problem; if so, it calculates the actual percent fullness of the cell so that it can be displayed on the screen at a later time.

Figure 18:
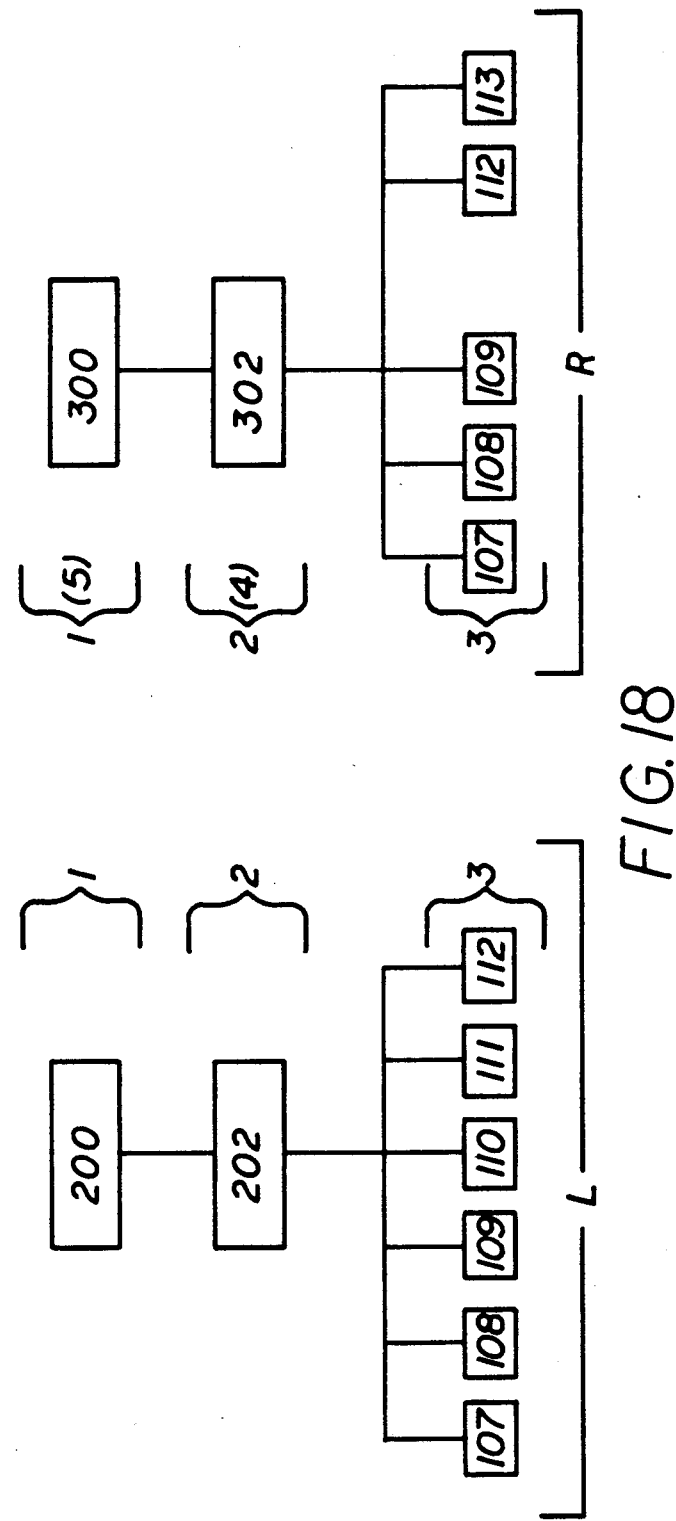
FIG. 18 is a schematic diagram of a routing search.

Referring to FIG. 1 and points 100 and 102 which correspond to an origin and a destination, respectively, a set of routes are now determined by the map routing method. First, the cable routing option is chosen from the Maproute main menu. The cable operations format appears on the display screen along with the floor layout. The mouse is moved to the origin location on the cable operations format of FIG. 16 and digitized. The mouse is then moved down to location 100 on the floor 10 of FIG. 1 and digitized. The program determines the location of the mouse at location 100 and compares that location to all coordinates of elements of length and components stored in the graphics database. When the prerecorded coordinate corresponding to the origin location 100 is found, the pointer associated with that element in the graphics database links to the respective PCWC or sleeve database, and a CIC code associated with the origin location 100 is filled into the cable operations format. A similar process occurs for the CIC code corresponding to the destination. The mouse is then moved to the define route box of the cable operations format and the mouse is digitized. The routing process then proceeds. The equation defining the path of the element of length associated with origin 100 is solved simultaneously with the equation associated with the path of the element of length associated with the destination location 102. Since path 104 terminates at trench 18 and path 106 terminates at trench 19 with a void 27 between the two trenches, there is no intersection point between the two paths and thus no connection. All elements of length that the path 104 intersects are saved in the first level of the memory array. Note, this is a level one search. Referring to FIG. 18, there are shown the levels and the respective elements of length that are identified at each search level. FIG. 18 represents the origin tree and FIG. 18 represents the destination tree. At the top of FIG. 18 is a box 200 representing path 104 and at the top of FIG. 18 is a box 300 representing path 106. Boxes 200 and 300, being the first boxes in the tree, are representative of level one. Level two consists of boxes 202 and 302 of FIGS. 18 and 18, respectively. Boxes 202 and 302 carry the equations of the paths associated with trenches 18 and 19, respectively. Trenches 18 and 19 are the only elements of length that intersect paths 104 and 106. As described above, this intersection was determined by taking the equation for path 104 and simultaneously solving this equation with each equation that represents an element of length on the memory array. The memory array carries all the beginning and ending points of each element of length in that floors. Since only one trench intersects paths 104 and 106, there is only one box 202 and 302 associated with the second level of search for the origin and destination, respectively. A check is made here (failing). The third level of search determines all elements of length that intersect trench 18 and trench 19. Paths 107, 108, 109, 110, 111 and 112 intersect trench 18 and paths 107, 108, 109, 112 and 113 intersect trench 19. Paths 104 and 106 also intersect trenches 18 and 19, respectively; however, these are the paths associated with the origin and destination and have already been identified as connecting the respective trenches in the first level of search. The program determines that paths 107, 108, 109 and 112 are common paths between the origin and destination and as such, can be routes. The program then saves in memory each connecting path by storing each beginning and ending point of each path from each level of search, thus forming an entire route.

For instance, the beginning point 100 and the ending point in trench 18 of path 104 is recorded at level one in box 200, as well as the intersection point of the path 104 with trench 18. The beginning and ending points of paths 107 through 113 are also recorded in their respective boxes, as well as any intersection points with trenches 18 and 19. Essentially, the paths are linked together from intersection point to intersection point. When the common paths are met, their intersection points with their respective trenches are linked, thus completing the overall path. When the route is created, the level begins at the origin and is counted down to the destination point. Thus, level one is associated with the origin path, level two is associated with the trench 18, level three is associated with the common lines 107, 108, 109 and 112, level four is associated with trench 19, and level five is associated with the destination 300. The program carries out one additional level of search for each origin and destination point. At that level, all intersecting elements of length for each path 107 through 113 are saved in a memory array, checked for commonality, and sorted by length in a manner similar to what was described above for a level five search.

This procedure for finding the intersection of all elements of length with respect to a certain pathway can be extended throughout the entire building via the vertical sleeves between the floors. Under these circumstances, a determination is made of what elements of length intersect each sleeve and radiate out therefrom, then there is constant checking for commonality of elements of length between the origin and the destination at any given level of search.

A cable run can also be manually created. To do this, starting from the origin, the raceway associated therewith is located by the mouse, and the mouse digitized. Then a next raceway which must be connected to the previously identified raceway is located by the mouse, and the mouse again digitized. This procedure is repeated until the raceway associated with the destination is reached. Note, each raceway selected must directly connect the previous raceway selected. If the manual write option is selected, the following process occurs. First, required information pertaining to individual rep lines selected is extracted from subroutine rep info (discussed below). Then the intersection of the previously selected rep line is found; if it is the first rep line selected, then the perpendicular intersection with the origin is identified. Check capacities along the length of the previously defined leg of the route are carried out via the capacity check program identified earlier. The new route is displayed on the screen and any old routes are erased. Finally, a check is made that the latest rep line selected is accessible to the destination and if so, then a complete route has been defined.

The subroutine rep info extracts pertinent information regarding a selected rep line. From the graphics database, information is extracted regarding the end points of the rep line, and from the cable runs database, information is extracted concerning the CIC code as well as the type of cell run corresponding to the selected rep line.

Also, in the cable operations format, the route status can be changed, the route can be removed, or the route can be entered. In order for a route to be entered, first, the define route mode must be activated which is done by moving the mouse into the block associated with define route and digitizing the mouse. (It must be remembered that the origin and destination locations must be identified in order to carry out the routing). A route then is determined for the user. If the user decides to choose that route, then the enter route mode is activated, and the route is stored in permanent memory.

The enter route option stores the information of the route into the graphics database and any associated information in the cable runs database and cable runs file. In order for the change route status option or remove route status option to be used, the I.D. or CIC code of the route must be entered into the define route block. The user may enter the CIC code if it is recalled or access it through the computer. If the CIC code is obtained by the computer, it is assumed there is a defined route in existence. The user accomplishes this by placing the mouse over the specific route and digitizing. The line associated with the cable route is the found, and the pointer associated therewith links to the cable run database and identifies the CIC code corresponding with the cable route. The CIC code is subsequently entered into the ID block of the cable operations format. The change route status accesses the cable runs file which causes the cable status to be changed. The remove route mode deletes the route of the cable from the graphics database and correspondingly erases any areas of the cable run databases to which an associated pointer in the graphics database points. If the enter route option is selected, the enter route subroutine first erases any information and any capacity marks which may exist along the route to be entered. The pertinent route information is then entered into the cable runs database and cable runs file via subroutine store cable discussed below. Next, a permanent line string is generated to represent the route in the graphics database, and the capacities of all effected capacity lines are adjusted by the new capacity subroutine discussed below. The capacities of any effected MADs are adjusted, if applicable, and any applicable presets are activated with subroutine activation status described previously.

The cable subroutine simply enters route information into the cable runs database and the cable runs file. The new capacity subroutine adjusts the capacity of each affected capacity line when a new cable is entered therein. For each affected capacity line, the subroutine calculates the new capacity by adding the cross sectional area of the active cable type to the current capacity of the capacity line and reenters this value to the correct location of the nongraphics information corresponding to the particular capacity line.

Figure 19:
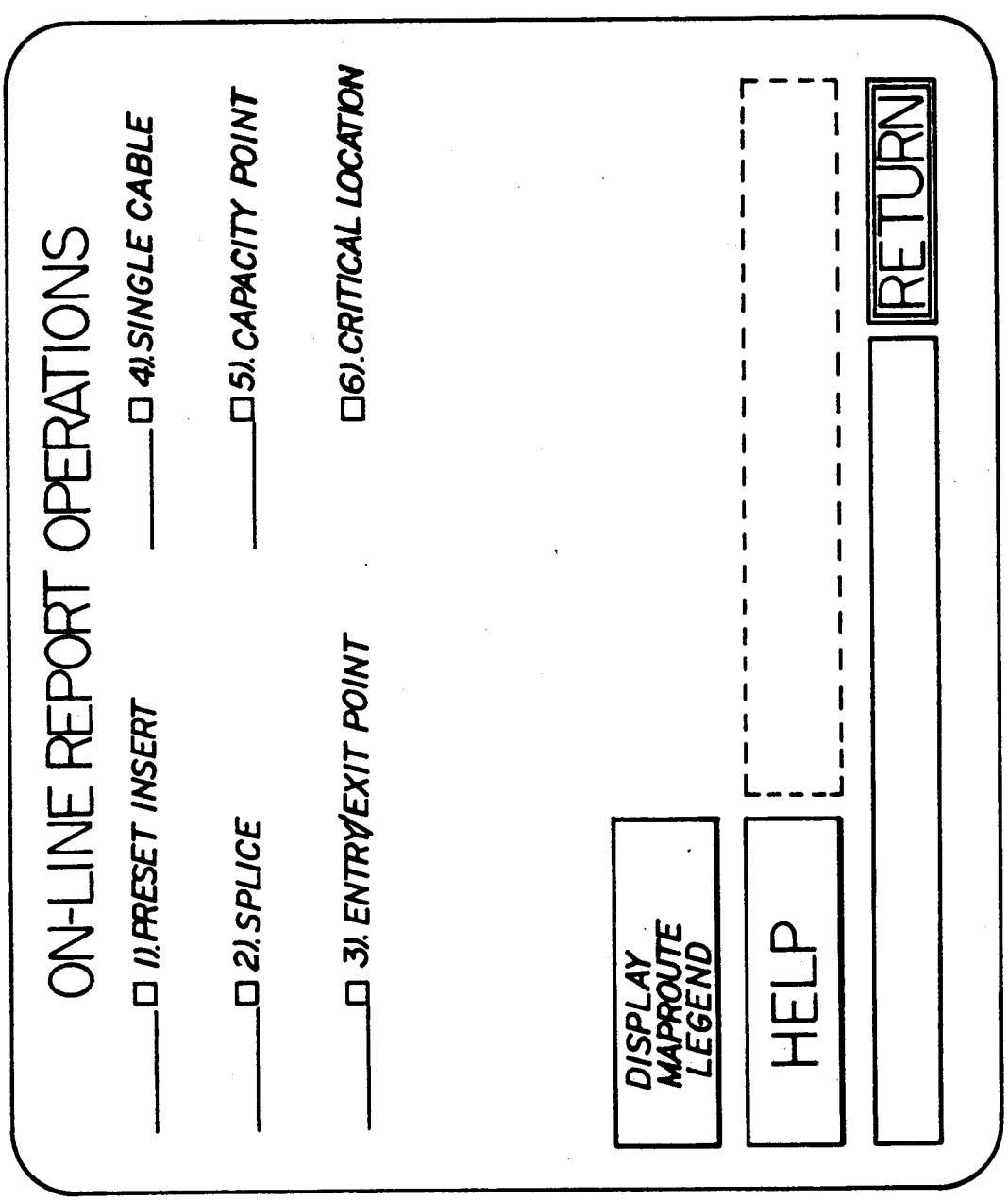
FIG. 19 is a view of the online report operations format.

The user is able to obtain online reports by choosing the online reports option from the main menu. After this is done, an online report operations format appears on the display screen (see FIG. 19). The user has the option of obtaining information about a preset, a splice, an entry/exit point, a single cable, a capacity point or a critical location. If information about a specific preset is requested, then all cables passing through the preset are listed on the display screen. The computer determines which cables pass through the preset by comparing the location of the preset with all origin or destination points of all cables and saving those cables which have a common location with the preset. An example of an online report for a preset insert is found in Table I.

TABLE I

INDIVIDUAL PRESET INSERT CABLE REPORT
PRESET INSERT ID: P-00174

| Item No. | 2 Urban Center User ID | Maproute Cable ID | Cable Type | Cable Status | Service | Floor Run Origin | Floor Run Destin |
|---|---|---|---|---|---|---|---|
| 1 | 2UC-C18-P | C-000018 | 1 | Active | Power | X-004 | P-00174 |
| 2 | 2UC-C23-C | C-000023 | 3 | Active | Comm1 | X-001 | P-00174 |
| 3 | 2UC-C24-D | C-000024 | 4 | Active | Comm2 | X-002 | P-00174 |

Appendix IV (not re-printed, see aplication file) shows the nomenclature convention for the CIC code.

If the user desires more information concerning a specific splice, then all cables entering or exiting the splice will be listed. For instance, Table II shows all cables entering or exiting splice S-0030.

TABLE II

INDIVIDUAL SPLICE CABLE REPORT
SPLICE ID: S-00030

| Item No. | 2 Urban Center User ID | Maproute Cable ID | Cable Type | Cable Status | Service | Floor Run Origin | Floor Run Destin |
|---|---|---|---|---|---|---|---|
| 1 | 2UC-C6-P | C-000006 | 9 | Active | Power | X-003 | S-00030 |
| 2 | 2UC-C7-P | C-00007 | 1 | Active | Power | S-00030 | P-00890 |
| 3 | 2UC-C6-P | C-00008 | 1 | Active | Power | S-00030 | P-00817 |

If the user wishes more information about an entry/exit point, then all cables passing through the entry/exit point can be listed. For example, the following Table III lists seven cables passing through the entry/exit point X-001 as well as other information.

TABLE III

INDIVIDUAL ENTRY/EXIT POINT CABLE REPORT
ENTRY/EXIT POINT ID: X-001

| Item No. | 2 Urban Center User ID | Maproute Cable ID | Cable Type | Cable Status | Service | Floor Run Origin | Floor Run Destin |
|---|---|---|---|---|---|---|---|
| 1 | 2UC-C2-C | C-000002 | 2 | Active | COMM1 | X-001 | P-00293 |
| 2 | 2UC-29-C | C-000009 | 5 | Active | COMM1 | X-001 | P-00186 |
| 3 | 2UC-C10-C | C-000010 | 5 | Active | COMM1 | X-001 | P-00346 |
| 4 | 2UC-C11-C | C-000011 | 5 | Faulty | COMM1 | X-001 | P-00206 |
| 5 | 2UC-C21-C | C-000021 | 3 | Active | COMM1 | X-001 | P-00303 |
| 6 | 2UC-C22-C | C-000022 | 3 | Active | COMM1 | X-001 | P-00500 |
| 7 | 2UC-C23-C | C-000023 | 3 | Active | COMM1 | X-001 | P-00174 |

-If the user wishes to know more about a single cable, then the online report operations supplies the user with the complete route as well as other information concerning the cable. For instance, Table IV shows cable C-00003 and the route it follows through the floor as well as other information.

TABLE IV

INDIVIDUAL CABLE REPORT
MAPROUTE CABLE ID: C-000003

| 2 Urban Center User ID | Cable Type | Cable Status | Service | Trunk Cable | Pair Low | Pair High | Total Length |
|---|---|---|---|---|---|---|---|
| 2UC-C3-P | 9 | Faulty | Power | | | | 142 |

Complete Route: X-02-003   D-02-0291-P   T-02-005-P   D-02-0263-P

If the user wishes to know more information about a capacity point then the online report operations supplies, the user with the amount of capacity used in a capacity segment in units of square inches along with the cables passing through the capacity point. For instance, Table V shows capacity segment E-0157-P-018 with 0.410 square inches of capacity used, the cables passing therethrough as well as other information concerning the segment.

TABLE V

INDIVIDUAL CAPACITY SEGMENT CABLE REPORT
CAPACITY SEGMENT ID: E-0157-P-018

Total Capacity: 5.500 sq in   Allowable Fill: 040%
Allowable Capacity: 2.200 sq in   Amount Used: .410 sq in

| Item No. | 2 Urban Center User ID | Maproute Cable ID | Cable type | Cable Status | Service | Floor Run Origin | Floor Run Destin |
|---|---|---|---|---|---|---|---|
| 1 | 2UC-C6-P | C-000006 | 9 | Active | Power | X-003 | S-00030 |

TABLE V-continued

INDIVIDUAL CAPACITY SEGMENT CABLE REPORT
CAPACITY SEGMENT ID: E-0157-P-018

| Total Capacity: | 5.500 sq in | Allowable Fill: | 040% |
| Allowable Capacity: | 2.200 sq in | Amount Used: | .410 sq in |

| Item No. | 2 Urban Center User ID | Maproute Cable ID | Cable type | Cable Status | Service | Floor Run Origin | Destin |
| --- | --- | --- | --- | --- | --- | --- | --- |
| 2 | 2UC-C20-P | C-000020 | 1 | Active | Power | X-004 | P-00883 |

If the user wishes to know more information about a critical location, the online report operations supplies the user with the amount of capacity used for each location segment. For instance, Table VI shows four critical location segments and the amount used in each as well as additional information concerning the critical location.

TABLE VI

CRITICAL LOCATION SUMMARY REPORT

| Item No. | Location Segment ID | Total Capacity | Allowable Fill | Allowable Fill | Amount Used |
| --- | --- | --- | --- | --- | --- |
| 1 | E-0283-C-003 | 16.000 sq in | 075% | 12.000 sq in | 1.240 sq in |
| 2 | E-0285-P-003 | 5.500 sq in | 040% | 2.200 sq in | .900 sq in |
| 3 | E-0293-O-003 | 16.000 sq in | 075% | 12.000 sq in | .518 sq in |
| 4 | U-0004-C-028 | 30.374 sq in | 075% | 22.780 sq in | .520 sq in |

The user may obtain a hard copy report of various components in the floor by choosing the hard copy option from the main menu. After doing so, a hard copy report operations by floor format appears on the display screen as shown in FIG. 20. The user may then choose to receive a hard copy report about a cable, a capacity point, entry/exit point, multi-access device, preset insert, splice, trench compartment, vertical sleeve or special report. Considering the type of component type chosen, the user may then choose to receive information on all of those types of components, an individual type of component, or a range of components. If the individual or range component selection mode is chosen, then the CIC number or the CIC numbers, respectively, must be inserted to obtain the necessary information. This can be done from the user's own memory or by placing the mouse on a desired component and digitizing it with the CIC code being found as described above. In addition, the user may choose an optional cable selection variable format which prints out the information by status, by cable type or by trunk cable. Additionally, information of the component may be limited by the date it was placed. It can be limited by placement after the date, before the date, between two dates or on a date. When the hard copy is delivered to the user, the computer program formats the information for the user according to the specific selection the user made. Also, a single report or combined reports may be obtained through the roll-over box A.

Figure 21:
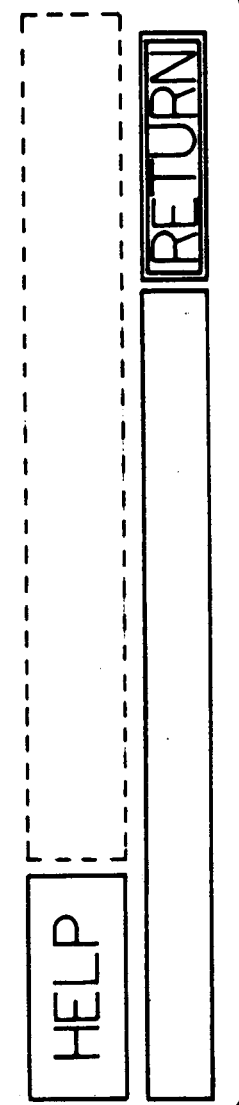
FIG. 21 is a view of the highlight operations format.

The user may also wish to highlight certain components of the graphics display. The user may do this by choosing the highlight operations mode from the main Maproute menu. The user may then choose to highlight presets, splices, entry/exit points, single cables, cable types, dormant cables, faulty cables and/or critical locations (see FIG. 21). By choosing a component to be highlighted, the component or components will appear on the display screen with a brighter color relative to the unhighlighted components. If the highlight option is chosen and either a preset, splice or entry/exit device is to be highlighted, then the following procedure occurs. The component CIC code is input and verified that it exists. An error appears if the CIC code of the component does not exist. The graphics datafile is searched for the preset, splice and entry/exit points.

Figure 22:
FIG. 22 is a view of the graphic display controller format.

The user may wish to limit or increase the features displayed on the display screen. By choosing the display operations format from the main menu, the user may choose to display presets, deck lines, trench lines, cables, cable runs, capacity check points, preset I.D. numbers, cell I.D. numbers, trench I.D. numbers, column lines and/or furniture (see FIG. 22). Then only those components chosen appear in the graphics display. Of course, if all components are chosen to be displayed, then all components appear on the display screen at the same time.

Figure 23:
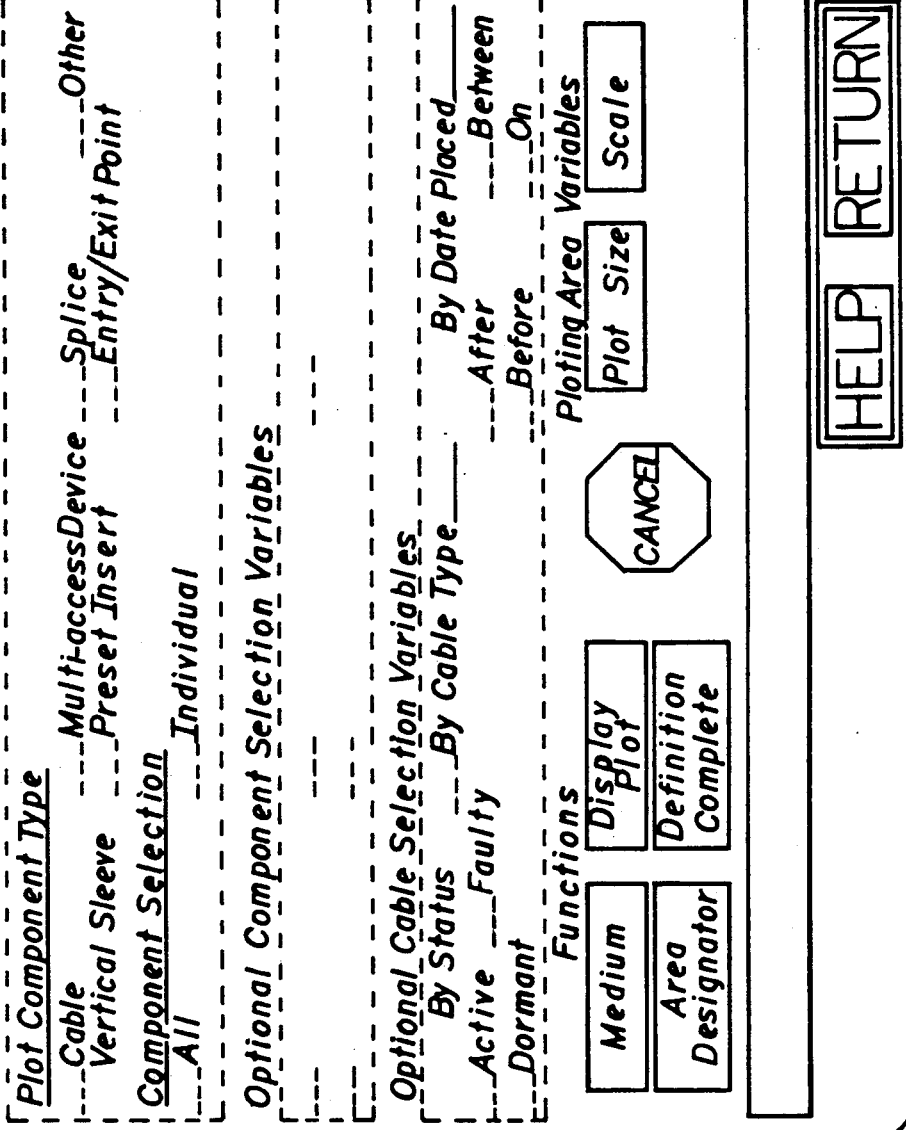
FIG. 23 is a view of the plotting operations format.

A hard copy plot is made available through the plotting operations option. As shown in FIG. 23, the user can choose to plot any of the following component types: cable, vertical sleeve, multi-access device, preset, splice, entry/exit point and /or other pre-defined components. Furthermore, the plotting operation can be limited by cable status, type or date place. Once the user decides on the display features, the user can then choose four plot sizes, $8\frac{1}{2}"\times11"$, $12"\times18"$, $24"\times36"$ and $36"\times42"$. The plot may appear in five different scales; 1/16", $\frac{1}{8}"$, 3/16", $\frac{1}{4}"$ or $\frac{1}{2}"$ per foot. The plot can be printed out on a paper, vellum or mylar medium. By the user simply identifying the desired plot size, scale and medium in the respective boxes or the plotting operation format, see FIG. 23, and then placing the outline of a square that appears on the display with the mouse over the specific display area to be plotted, the user is able to obtain a desired plot. The specific choices of plot size, scale and medium are obtained through the appropriate display in the respective roll-through boxes that exist for each.

Figure 24:
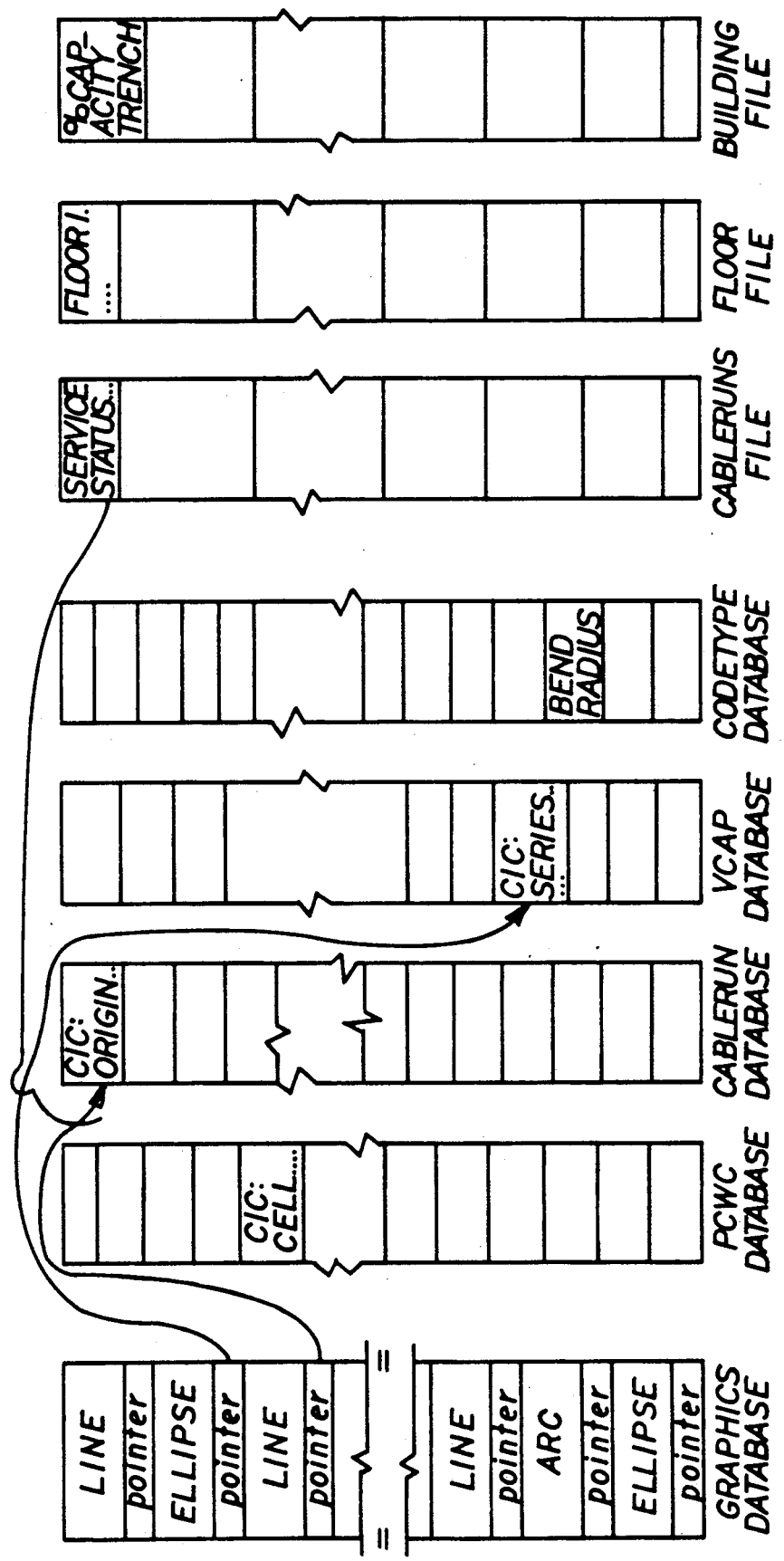
FIG. 24 is a schematic diagram of the databases and files in the Maproute program.

The Maproute program consists of three files, four databases, and a graphics database. Fig. 24 is a representative drawing of the files and databases. Only the graphics database contains information concerning the structure and the location of components therein. The four other databases contain information in alphanumeric form which is related to the managerial aspects of the program. The three files are concerned with additional managerial information and for making the program operate more efficiently and quickly.

Referring to FIG. 24, the graphics database file contains location information on every aspect of the building which is relevant to Maproute. The information contained therein is in the coordinate form and specifically contains the coordinates of elements of length that form the structure. These elements include line segments with beginning and ending points, ellipses with beginning and ending points and their major and minor axes, or arc lengths with beginning and ending points. (There are actually 17 different elements available for use that are provided by the Intergraph graphics package.) Each discrete portion of information is dumb as to the type of component it represents. However, each portion of information has associated with it a pointer that points or links to a database wherein information exists concerning the type of component the information portion corresponds to. In addition, there is an array in memory of just the beginning and ending points of each element of length and its type to speed up the routing procedure.

The databases carry information to supplement the graphics database. The databases identify the type of elements of length, such as trenches or decks, or specific element locations, such as presets or splices. The four databases are the following.

The permanent component cable database, or the PCWC database, contains managerial information in alphanumeric format containing CIC numbering of entry/exit points, presets, cells, compartments, deck capacity, trench capacities, and multi-access devices. There is one PCWC database for each floor in a building. The PCWC database contains information pertaining to any permanent features of a floor. It includes entities of drawings, entry/exit points, holes, cell reps, compartment reps, cell capacities, compartment capacities and MADs ( an entity is a distinct subset of a database and contains information relevant to a specific type of component in the structure). The drawing entity keeps track of the number of floors and the number of each type of components used throughout the building. These include entry/exits, presets, splices, cells, compartments or MADs. The entry/exit points, or pull boxes, include information such as the CIC code associated with a specific pull box, capacity currently used in that specific pull box, total capacity available in the pull box, the origin and destination slack lengths associated therewith, the panel board number associated therewithg, each cell or compartment up to five passing therethrough, the type of service of the pull box, the power in amps currently passing therethrough and the total power in amps available in a specific pull box. The hole or preset entity contains the CIC code, the status, the type of hole (preset or afterset—an afterset is a hole formed after cement has been laid over the trenches and decks), the origin and destination slack lengths, the capacity currently used therein, the total capacity available therein, and space for three cells or compartments that the hole accesses. The cell rep entity includes its CIC code, its service, its total available capacity, and its type of ending connection (vertical capacity closure, cell, trench void or cell feed). The compartment rep entity includes information, such as CIC code, service type, total available capacity and compartment width. The cell capacity entity contains the CIC code associated therewith, the deck with which the cell is associated, the type of service, the capacity currently used in square inches and the critical capacity in square inches of the cell. The compartment capacity entity contains information including its CIC code, the trench with which it is associated, its capacity currently used and its critical capacity. The multi-access device entity includes the CIC code associated therewith, the pull box associated therewith, the preset associated therewith, its cable service type, the capacity currently used therein, and the total capacity of the MAD.

The cable database or cable run database contains information concerning the specific CIC identity of each discrete segment of a cable route. The cable run database contains a CIC code associated with a specific cable, the CIC code associated with the origin, the CIC code associated with the destination and the CIC code associated with each element of length which together make up the entire cable run of the cable. The cable run database structure is shown in Appendix II (not reprinted; see application file).

The cable specifications or code type database carries relevant information concerning each type of cable and the specification associated therewith. The code type database that provides all the information concerning cable specifications of each type of cable used within the structure. The information stored within this database includes the manufacturer of the cable, the manufacturer's part number, if any, a user part number, the service of the cable, the type of connector that can be used for the cable and geometric information of outside diameter, cross-section, bend raidus, maximum length, pulling tension and origin and destination default slack length. This database directly corresponds to the cable specifications format that appears from the main menu.

The fourth database of Appendix II is the VCAP database and deals with the vertical capacity of the building. There is only one VCAP database for the entire building, as opposed to the three databases mentioned previously which exist for every floor. For instance, if there are ten floors in a building, there will be ten PCWC databases,etc. With the VCAP database, there is only one database for the entire building since the vertical sleeves run through the floors of a building. The VCAP database maintains information concerning series and sleeves. (All the vertical sleeves related to each other are designated a series.) The series entity of the database includes the type of service of the series, as well as the home run distance or length of the series in feet. The sleeve entity maintains information on each individual sleeve. Included in this information is the series with which the individual sleeve is associated, the floor on which the sleeve is located, the total capacity of the sleeve, the capacity currently used by the sleeve, and the closet in which the sleeve is located. Information is entered or removed from this database through the system maintenance format, FIG. 9, of the main menu and others.

The files access the nongraphic databases and make per building changes throughout the databases which are also found in Appendix II (not reprinted; see application file). The cable runs file changes the status and service of cables as well as all other information pertaining to managerial aspects of cables, but which do not at all relate to the graphics portion of the database. The cable runs files contains general information including service type, status, cable type, cable length and specific identification to each floor database and each vertical series in the building. Whenever any of the information held by the cable runs file is modified through the use of the proper option format selected from the main menu, there is a corresponding modification made wherever that specific cable has information pertaining to it in a floor database.

The map building default file sets the percent fill capacity of the power and communication cells and compartments in the respective decks and trenches that run throughout the building. It essentially provides parameters for the alarm that notifies the user when the amount of capacity has been exceeded.

The map floor file contains the real floor number as opposed to the floor number used in a system, such as floor 13 is usually identified as floor 14 in building, as well as the ability to access each floor's databases quickly.

The Maproute computer program is preferably written in the computer language of Fortran. However, any other computer language may be used to write the Maproute computer program.

The present invention also pertains to a cable management system 200 for a building (not shown). The cable management system 200 comprises a computer 202 having a memory 204 for storing a building structure and cable base as shown in FIG. 25. The base includes specifications for each type of cable used in the building, building parameters with regard to the cable, and locations of raceways of the building structure with regard to cable used therein. The computer 202 includes means 206 for routing an individual cable having a status and a service through a cable run in the building structure. There is also means 208 for displaying the route of the cable in the building structure. The computer 202 also includes means 210 for checking capacity with regard to each intersection of raceways of the cable route. There is also means 212 for reporting the status and service of the cable, and means 214 for storing the cable's route in the memory 204.

While a presently preferred embodiment of the invention has been shown and described in particularity, it may be otherwise embodied within the scope of the appended claims.

APPENDICES I–IV

TABLE OF CONTENTS

APPENDIX I
 Glossary
APPENDIX II
 Database and File Structure
APPENDIX III
 Subroutine for Cable Routing
APPENDIX IV
 CIC Code Naming Convention

I claim:

1. A method for managing cable in a building structure using a digital computer comprising the step of inputting into a database of said computer data pertaining to the building structure and the cable, and the computer implemented steps of:
 routing automatically in the building structure a cable having a service through a cable run having a plurality of cables and a fill capacity;
 displaying the route of the cable in the building structure; and
 determining percent fill capacity of the cable run after the routing of the cable through the cable run.

2. The method as described in claim 1, including the step of reporting on the cable for purposes of inventory and analysis.

3. The method as described in claim 1 wherein the displaying step includes the step of highlighting at least one type of distribution component.

4. The method as described in claim 1 wherein the displaying step includes the step of displaying at least one component of the building structure.

5. The method as described in claim 1 wherein the displaying step includes the step of plotting at least one component at a location in the building structure.

6. The method as described in claim 5 wherein the plotting step includes the steps of:
 choosing a plot size and a scale size;
 selecting at least one type of component to be plotted; and
 plotting each selected component in a defined location of the building structure.

7. The method as described in claim 1 wherein the display step includes the step of listing information with regard to the building structure of at least one individual type of component.

8. The method as described in claim 1 including, before the routing step, the step of modifying the building structure database to take into account any changes thereof.

9. The method as described in claim 1 wherein the routing step includes the steps of:
 (a) identifying elements of length corresponding to an origin and a destination;
 (b) determining whether the origin element of length and the destination element of length identified in step (a) intersect;
 (c) identifying all elements of length that intersect the origin element of length and all elements of length that intersect the destination element of length;
 (d) determining whether the elements that intersect the origin element and the elements that intersect the destination element identified in step (c) intersect;
 (e) repeating step (c) at least once to identify elements of length that intersect elements corresponding with the origin and identified in the previously performed step (c), and to identify elements of length that intersect elements corresponding with the determination and identified in the previously performed step (c) and step (d) at least once to determine whether the elements corresponding with the origin and the elements corresponding with the destination and identified in the last performed step (c) intersect;
 (f) connecting all the elements of length corresponding with each intersection determined in steps (d) and (e) to form a set of routes;
 (g) eliminating all routes in the set that cross through, enter or exit a trench more than once;
 (h) eliminating all routes in the set that are longer than a cable's maximum length; and
 (i) arranging remaining routes by length.

10. The method as described in claim 9 wherein the displaying step includes the steps of displaying the routes in the order of increasing length until a desired cable run appears, and storing the desired route in the computer database.

11. The method as described in claim 1 wherein the routing step includes the steps of:
 choosing an origin;
 determining an origin element of length corresponding to the origin;
 determining a destination element of length corresponding to the destination; and
 selecting at least one additional element of length which communicates the origin element of length with the destination element of length.

12. The method as described in claim 1 wherein the determining step includes the step of adding an additional cross-sectional area of cable to an amount of cross-sectional area filled in the cable run; and displaying a preset fullness of the cable run.

13. The method as described in claim 1 wherein the routing step includes the step of entering the route in the database.

14. The method as described in claim 13 wherein the routing step includes after the entering step, the step of deleting the route from the database.

15. The method as described in claim 1 wherein the routing step includes the step of modifying the status and service of the cable.

16. A cable management system for managing cable in a building structure comprising the steps of:

defining the building structure with regard to cable used therein;

setting parameters of the structure with regard to the cable;

defining specifications with respect to cable used in the structure;

routing automatically in the building structure cable through a cable run having a plurality of cables and a fill capacity;

determining percent fill capacity of each cable run with each individual cable added;

displaying a cable's location in the structure; and reporting on status and service of the cable for analysis and inventory.

17. A cable management system for a building comprising a computer having a memory storing a building structure and a cable database, said database including specifications of each type of cable used in the building, building parameters with regard to each cable, and locations of raceways of the building structure with regard to cable used therein;

said computer including routing means for automatically routing in the building structure an individual cable having a status and a service through a cable run having a plurality of cables and fill capacity;

displaying means for displaying the route of the cable in the building structure, said displaying means connected to said computer; and said computer further including determining means for determining percent fill capacity of each raceway intersection of the cable run.

18. The system as described in claim 17 wherein said computer includes means for reporting the status and service of the cable.

19. The system as described in claim 17 wherein said routing means includes means for storing the cable's route in said memory.

* * * * *